(12) United States Patent
Barger et al.

(10) Patent No.: US 6,695,412 B2
(45) Date of Patent: Feb. 24, 2004

(54) CAR SEAT WITH ADJUSTABLE HARNESS

(75) Inventors: Jeffery A. Barger, Greenville, OH (US); Peter S. Macdonald, Palo Alto, CA (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/885,512

(22) Filed: Jun. 20, 2001

(65) Prior Publication Data

US 2002/0195867 A1 Dec. 26, 2002

(51) Int. Cl.$^7$ ................................................ B60N 2/28
(52) U.S. Cl. ................................ 297/484; 297/250.1
(58) Field of Search .......................... 297/250.1, 468, 297/483, 484

(56) References Cited

U.S. PATENT DOCUMENTS

| | | | |
|---|---|---|---|
| 2,143,634 A | 1/1939 | Saunders | 155/116 |
| 3,198,575 A | 8/1965 | Hawkins | 297/328 |
| 3,572,827 A | 3/1971 | Merelis | 297/253 |
| 3,791,694 A * | 2/1974 | Roberts et al. | 297/250.1 |
| 3,948,556 A | 4/1976 | Hyde et al. | 297/250 |
| 4,040,664 A | 8/1977 | Tanaka et al. | 297/389 |
| 4,047,755 A | 9/1977 | McDonald et al. | 297/216 |
| 4,058,342 A | 11/1977 | Ettridge | 297/250 |
| 4,168,050 A | 9/1979 | Nerem et al. | 248/393 |
| 4,205,877 A | 6/1980 | Ettridge | 297/321 |
| 4,376,551 A | 3/1983 | Cone | 297/250 |
| 4,402,548 A * | 9/1983 | Mason | 297/484 |
| 4,545,617 A | 10/1985 | Drexler et al. | 297/340 |
| 4,607,863 A | 8/1986 | Yokote | 280/804 |
| 4,632,456 A | 12/1986 | Kassai | 297/328 |
| 4,709,960 A | 12/1987 | Launes | 297/250 |
| 4,759,569 A | 7/1988 | Potter | 280/748 |
| 4,790,601 A | 12/1988 | Burleigh et al. | 297/484 |
| 4,858,997 A | 8/1989 | Shubin | 297/487 |
| 4,880,254 A | 11/1989 | Müller | 280/808 |
| 4,915,446 A | 4/1990 | Darling et al. | 297/250 |
| 4,936,629 A | 6/1990 | Young | 297/250 |
| 4,971,392 A | 11/1990 | Young | 297/250 |
| 5,115,523 A | 5/1992 | Cone | 5/94 |
| 5,125,686 A | 6/1992 | Yano et al. | 280/808 |
| 5,181,761 A | 1/1993 | Meeker | 297/250 |
| 5,335,964 A | 8/1994 | Sedlack et al. | 297/256.13 |
| 5,344,213 A | 9/1994 | Koyanagi | 297/256.13 |
| 5,443,037 A | 8/1995 | Saleme | 119/771 |
| 5,449,223 A | 9/1995 | Miculici et al. | 297/484 |
| 5,468,046 A | 11/1995 | Weber et al. | 297/238 |
| 5,496,092 A | 3/1996 | Williams et al. | |
| 5,527,094 A | 6/1996 | Hiramatsu et al. | 297/250.1 |
| 5,609,367 A | 3/1997 | Eusebi et al. | 280/808 |
| 5,609,393 A | 3/1997 | Meeker et al. | 297/256.13 |
| 5,615,917 A | 4/1997 | Bauer | 280/806 |
| 5,653,504 A | 8/1997 | Henson | |
| 5,678,887 A | 10/1997 | Sher | 297/250.1 |
| 5,683,138 A | 11/1997 | Ward, Jr. et al. | 297/256.15 |
| 5,713,109 A | 2/1998 | Cech | 24/200 |
| 5,722,731 A | 3/1998 | Chang | 297/473 |

(List continued on next page.)

FOREIGN PATENT DOCUMENTS

GB    2 282 321 A    5/1995

*Primary Examiner*—Peter R. Brown
(74) *Attorney, Agent, or Firm*—Taft, Stettinius & Hollister LLP

(57) ABSTRACT

A car seat having adjustable shoulder harnesses including a body having a seat pan and a seat back, the seat back having a front side and a back side. The car seat includes a pair of shoulder harnesses shaped and located to fit over the shoulder of an occupant located on the body. Each shoulder harness is movable relative to the seat pan to raise or lower the height of the shoulder harnesses. The car seat further includes a locking mechanism for locking each shoulder harness in place to set the height of each shoulder harness relative to the seat pan, wherein the locking mechanism can be accessed from the front side of the seat back.

37 Claims, 22 Drawing Sheets

U.S. PATENT DOCUMENTS

| | | | |
|---|---|---|---|
| 5,775,772 A | 7/1998 | Lefranc | 297/250.1 |
| 5,779,319 A | 7/1998 | Merrick | 297/484 |
| 5,794,977 A | 8/1998 | Frank | 280/801.2 |
| 5,845,967 A | 12/1998 | Kane et al. | 297/250.1 |
| 5,931,502 A | 8/1999 | Frank et al. | 280/801.2 |
| 5,988,759 A | 11/1999 | Bauer et al. | 297/483 |
| 6,030,047 A | 2/2000 | Kain | 297/484 |
| 6,155,638 A * | 12/2000 | Bapst | 297/250.1 |
| 6,398,302 B1 * | 6/2002 | Freedman et al. | 297/484 |

* cited by examiner

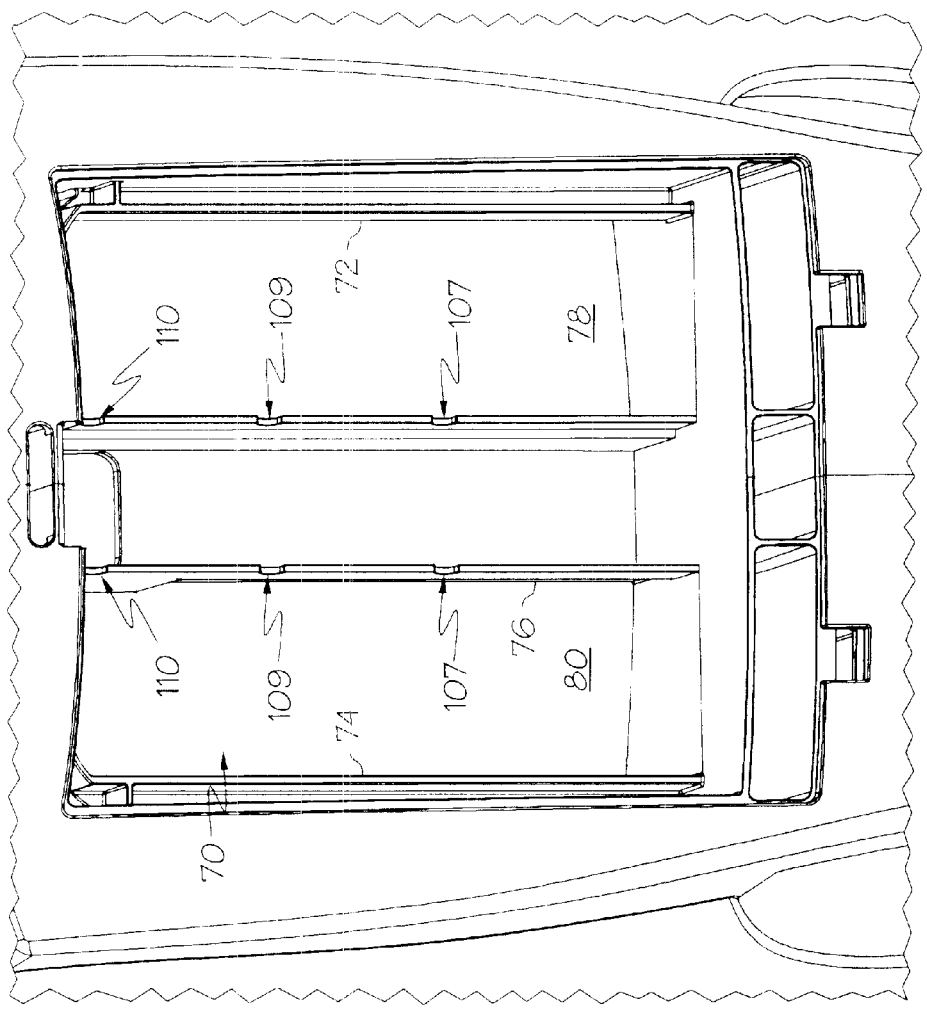

CAR SEAT WITH ADJUSTABLE HARNESS

The present invention is directed to a car seat, and more particularly, to a car seat with an adjustable harness.

BACKGROUND OF THE INVENTION

Car seats are widely used to secure children or infants in a vehicle. Such car seats are typically secured to the vehicle by one or more vehicle belts, and the car seat includes a harness to secure the occupant in the car seat. The harness may be vertically adjustable to accommodate growth of the occupant, differently-sized occupants, bulky clothing of the occupant, etc.

In many existing car seats, the height-adjusting mechanism is accessible only from the back side of the car seat. Accordingly, in order to adjust the height of the harness of such a car seat, the car seat first must be uncoupled from the vehicle to expose the back side of the car seat. The harness height can then be adjusted and the car seat re-attached to the vehicle. However, it can be inconvenient and time consuming to couple and uncouple the car seat to the vehicle each time it is desired to adjust the height of the harness.

SUMMARY OF THE INVENTION

The present invention is a car seat having adjustable shoulder harnesses including a body having a seat pan and a seat back, the seat back having a front side and a back side. The car seat includes a pair of shoulder harnesses shaped and located to fit over the shoulder of an occupant located on the body. Each shoulder harness is movable relative to the seat pan to raise or lower the height of the shoulder harnesses. The car seat further includes a locking mechanism for locking each shoulder harness in place to set the height of each shoulder harness relative to the seat pan, wherein the locking mechanism can be accessed from the front side of the seat back.

Other objects and advantages of the present invention will be apparent from the following description and the accompanying drawings.

BRIEF DESCRIPTION OF THE DRAWINGS

FIG. 19 is a rear perspective view of the car seat of FIG. 18, with the carriage removed.

DETAILED DESCRIPTION

Figure 1:
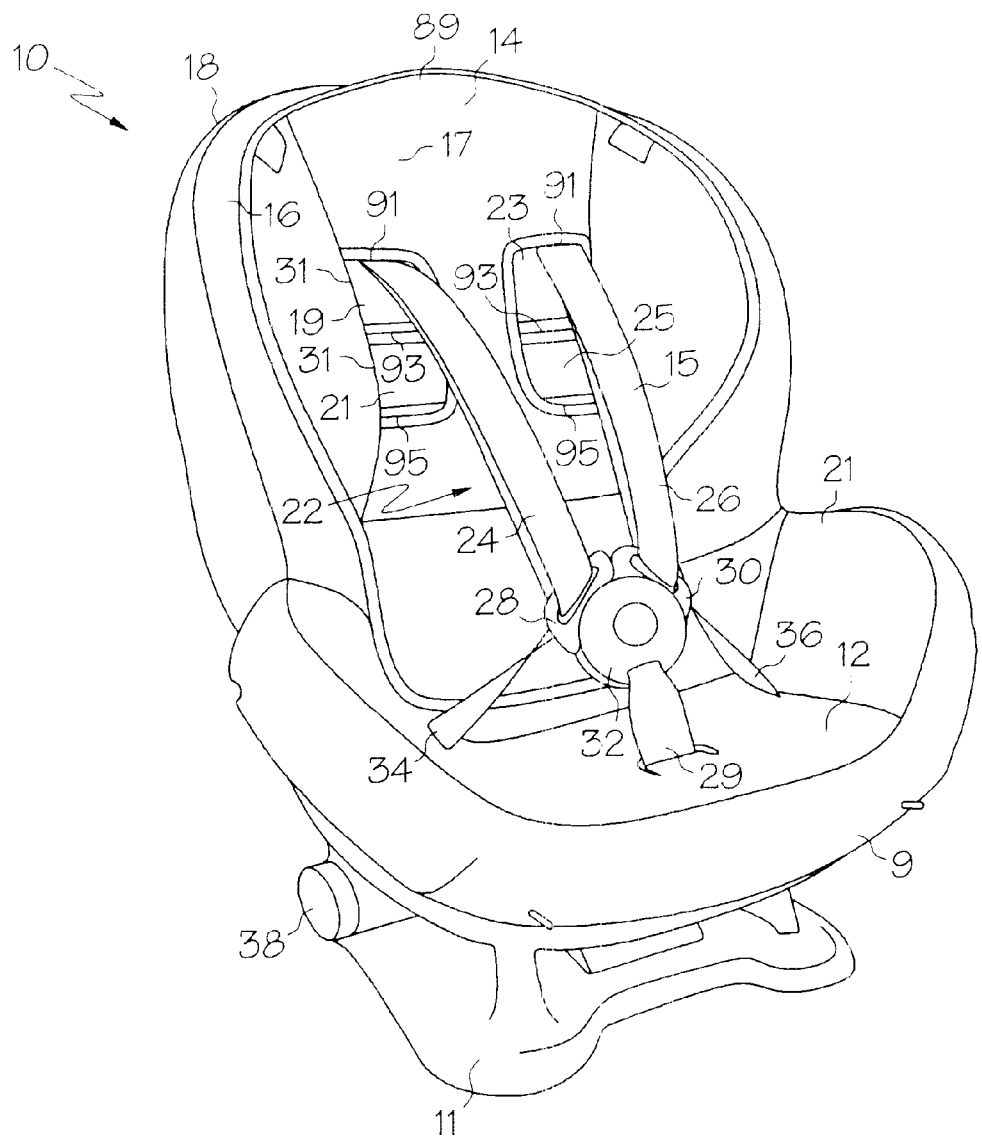
FIG. 1 is a front perspective view of one embodiment of the car seat of the present invention.
Figure 1A:
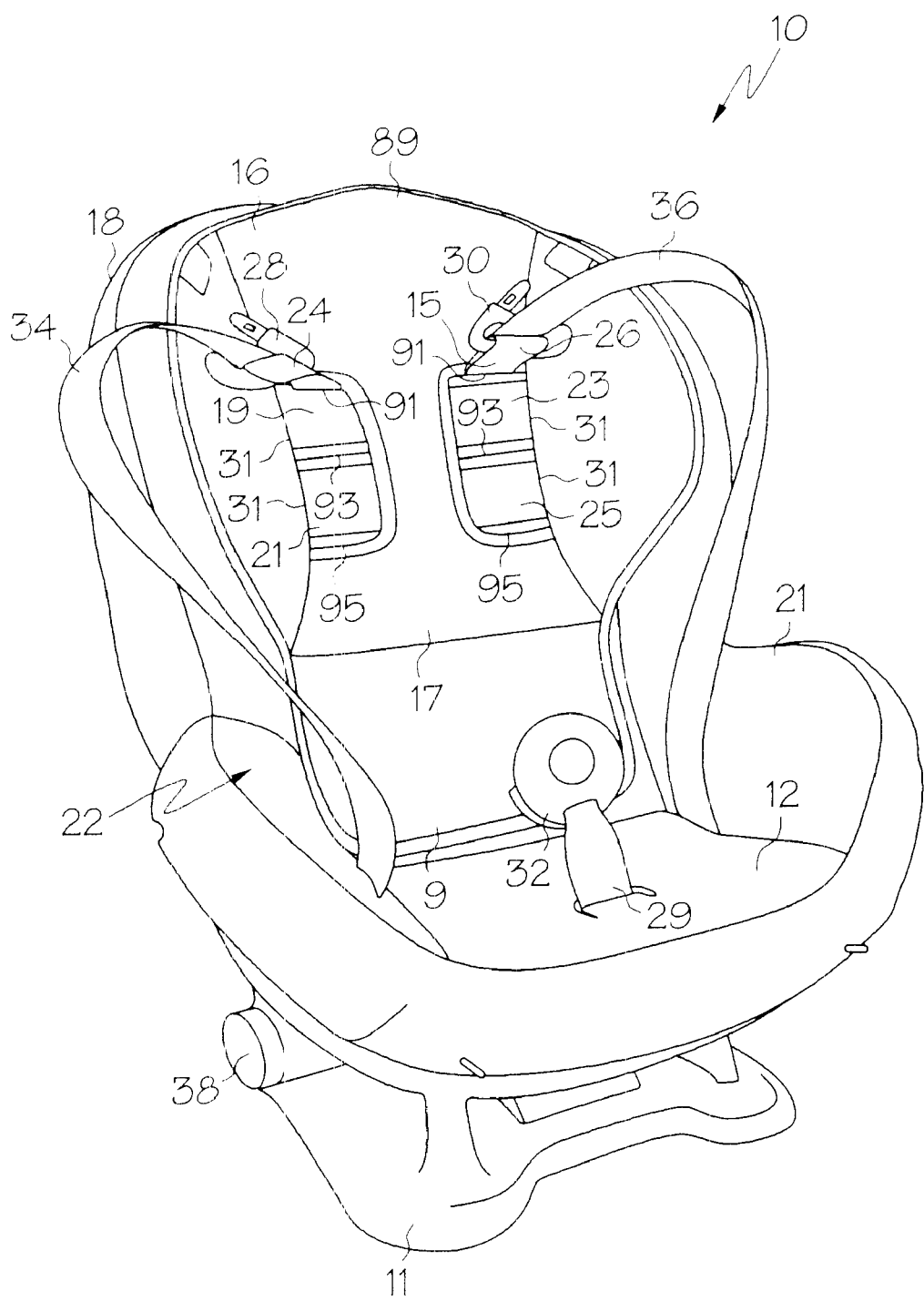
FIG. 1A is a front perspective view of the car seat of FIG. 1 with the harnesses unbuckled.

As best shown in FIGS. 1 and 1A, the present invention is a car seat 10 having a body 9 including a base 11, a seat pan 12 and a seat back 14. The seat back 14 has a front side 16 and a back side 18 and is shaped and located to support an occupant such as a child or infant. The back side 18 includes a back support surface 17 upon which the back of an occupant rests. The car seat 10 includes a shell 20 (FIG. 3) made of a relatively rigid material, such as plastic, the seat shell 20 primarily defining the seat pan 12 and seat back 14. The car seat 10 includes a soft cushioned covering 21 (FIGS. 1, 1A and 2) located over the shell 20 to provide a soft outer surface to the car seat 10.

The car seat 10 includes a restraint system 22 including a pair of shoulder harnesses 24, 26 shaped and located to fit over the shoulder of an occupant of the car seat 10. In the illustrated embodiment, each shoulder harness 24, 26 extends through the front side 16 of the seat back 14 and is looped around a tongue or latch 28, 30. Each tongue or latch 28, 30 is shaped to be releasably received in a buckle 32 (see FIGS. 1 and 1A). The buckle 32 is coupled to the seat pan 12 by a buckle belt 29.

The restraint system 22 further includes a pair of lap belts 34, 36, each lap belt 34, 36 being coupled to one of the tongues 28, 30. The restraint system 22 may be coupled to a belt tensioning mechanism (not shown) that may include a pair of opposed activation knobs 38 that can be rotated to add or decrease tension in the restraint system 22. Other belt tensioning mechanisms, such as a gripping mechanism that frictionally grips a portion of the belts in a well-known manner, may also be used.

Figure 2:
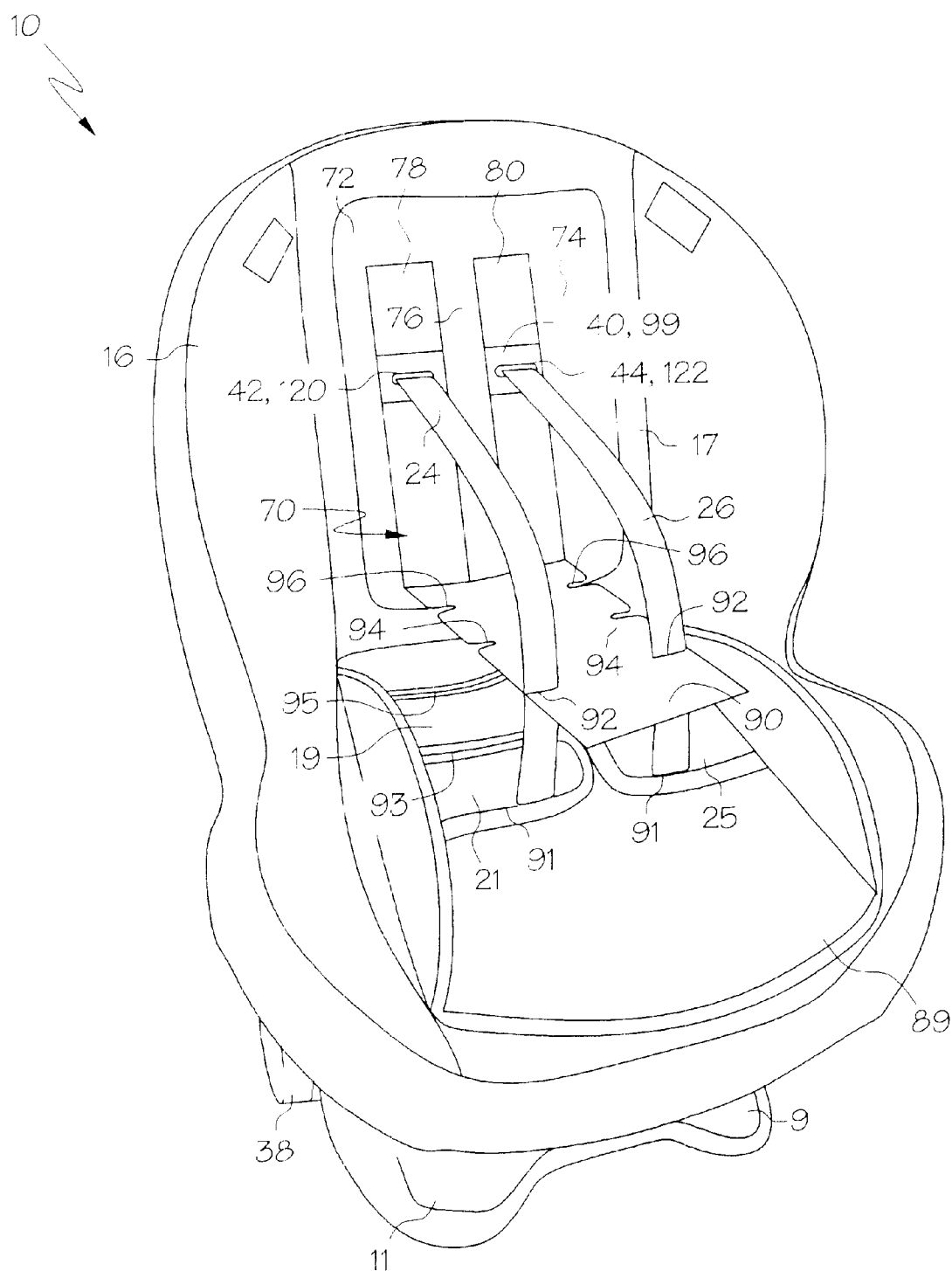
FIG. 2 is a front perspective view of the car seat of FIG. 1 with the cushion and cover pivoted open.
Figure 3:
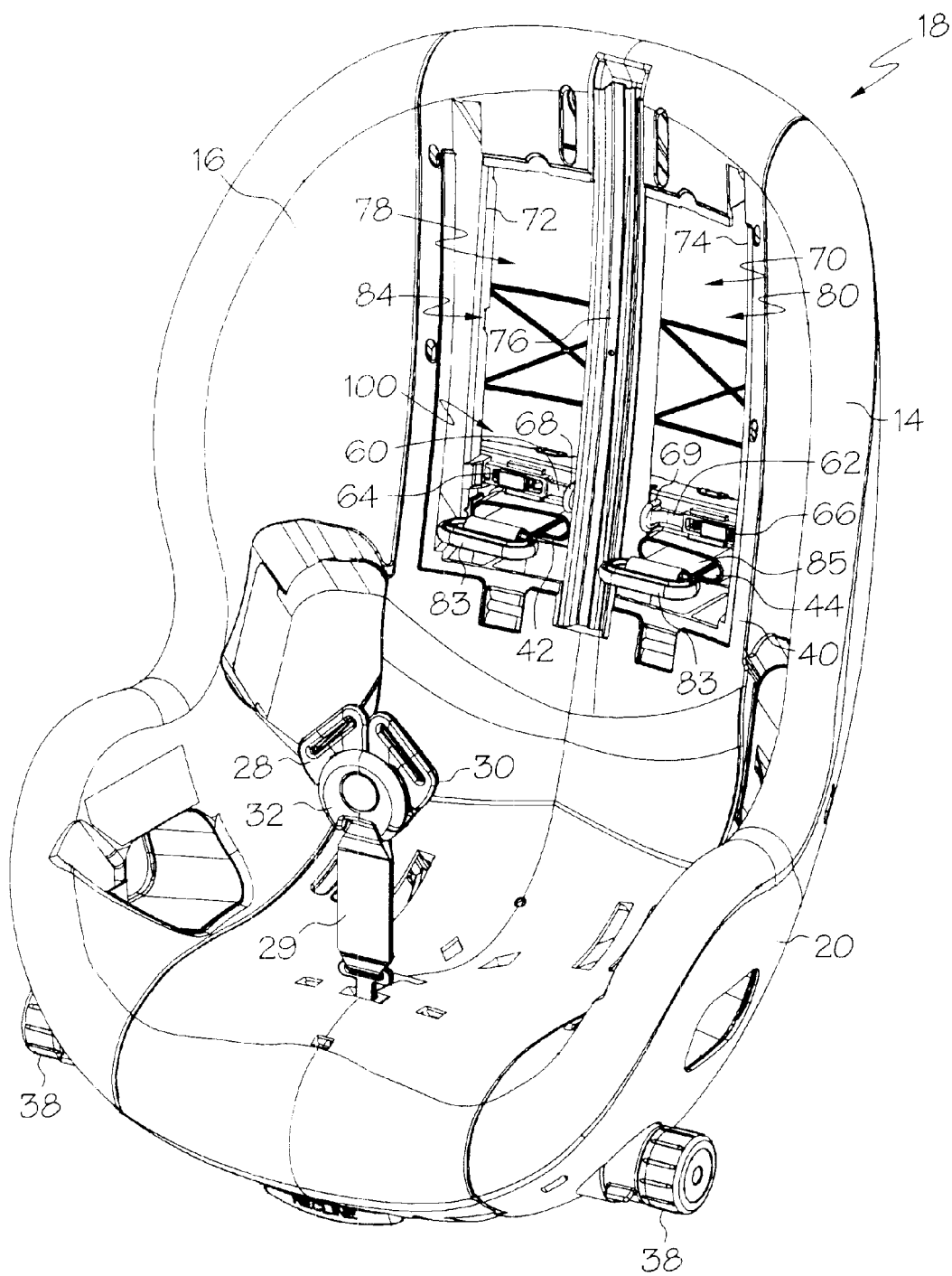
FIG. 3 is a front perspective view of the car seat of FIG. 1A, with the shoulder harnesses, lap belts, cushioned covering and back cushion removed.
Figure 4:
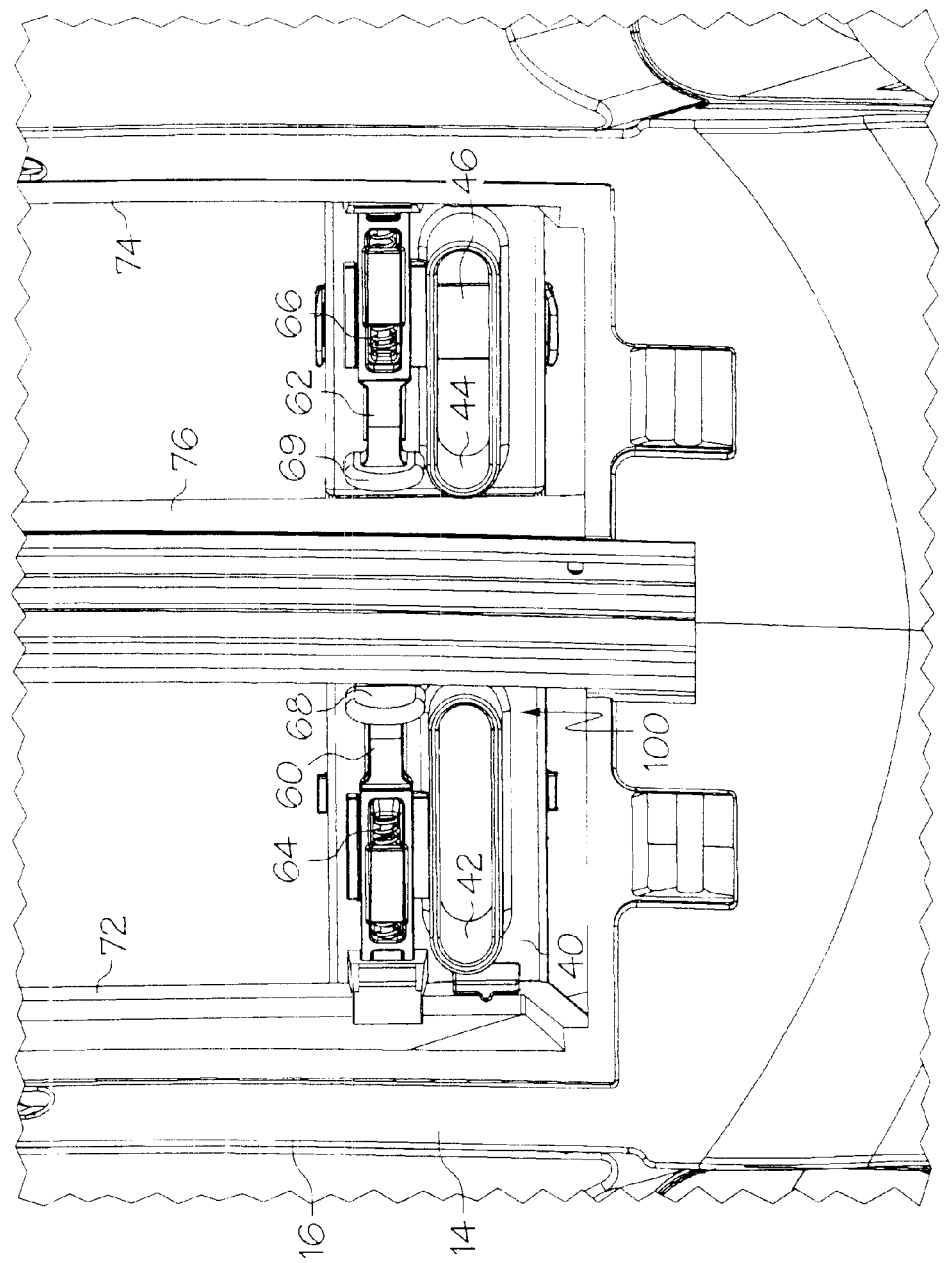
FIG. 4 is a detail front perspective view of the carriage of the car seat of FIG. 3, with the loops and extension straps removed.
Figure 7:
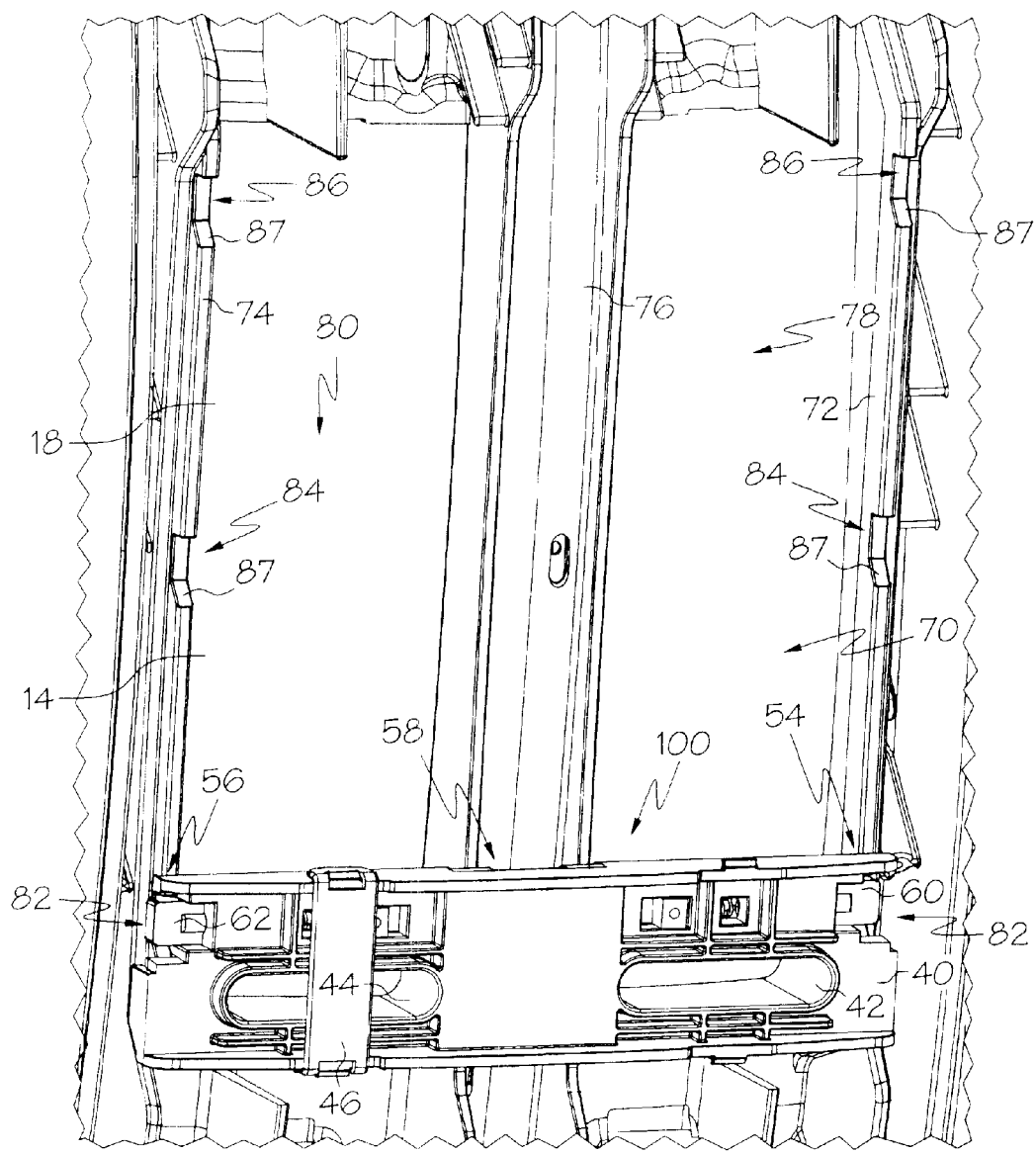
FIG. 7 is a rear perspective view of the car seat of FIG. 3, with the loops and extension straps removed.
Figure 8:
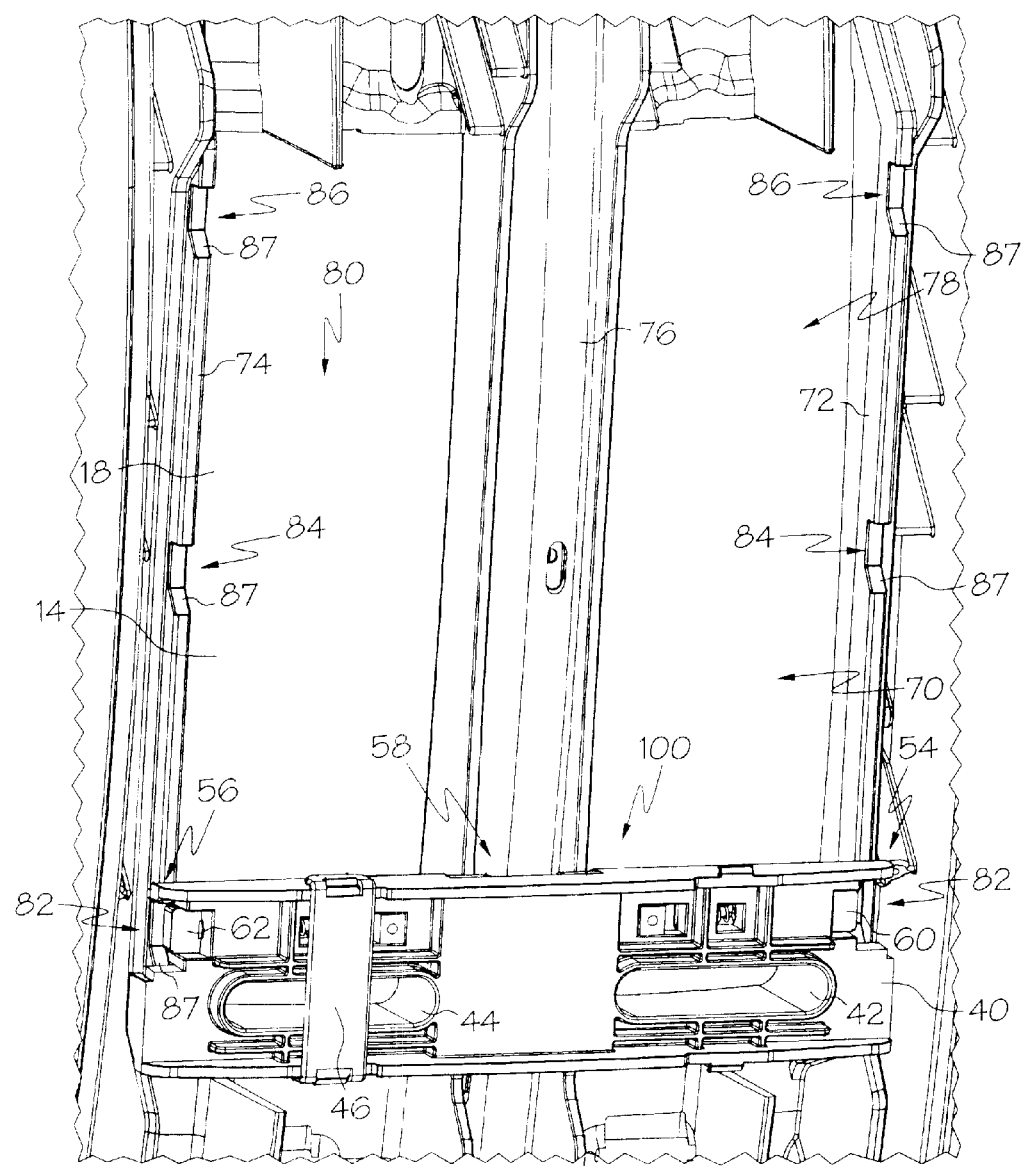
FIG. 8 is a rear perspective view of the car seat of FIG. 7, with the tabs of the carriage retracted.

As shown in FIG. 3, the seat back 14 includes an opening 70 in its front side 16, and a cover 90 (FIGS. 2 and 11) that can be removably received in the opening 70. The seat back 14 includes a pair of outer supports 72, 74 located on or adjacent to the outer edges of the opening 70, and a generally vertically-extending support bar 76 located in the center of the opening 70. The opening 70 can be nearly any opening of any size or shape in the seat back 14 that provides a non-continuous surface to the seat back 14. The support bar 76 defines a pair of slots 78, 80 in the opening 70, the slots 78, 80 being located on opposite sides of the support bar 76. As best shown in FIGS. 7 and 8, each outer support 72, 74 includes a set of vertically spaced grooves 82, 84, 86 formed therein. The grooves 82, 84, 86 of each support 72, 74 are horizontally aligned; that is, each groove 82, 84, 86 on support 72 corresponds to, or is located at the same height as, a groove on the support 74.

Figure 9:
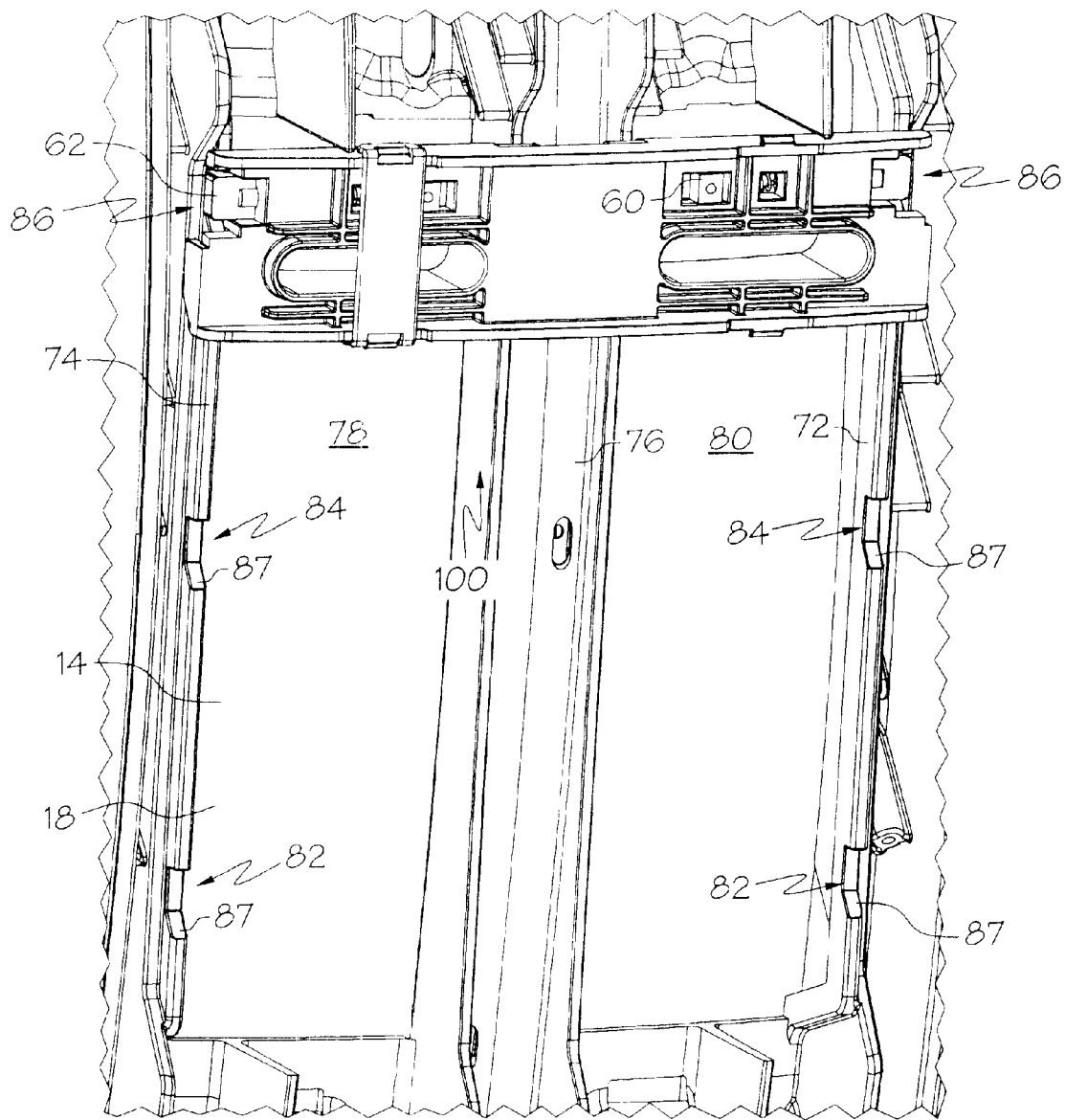
FIG. 9 is a rear perspective view of the car seat of FIG. 8, with the carriage moved to an upper position.
Figure 9A:
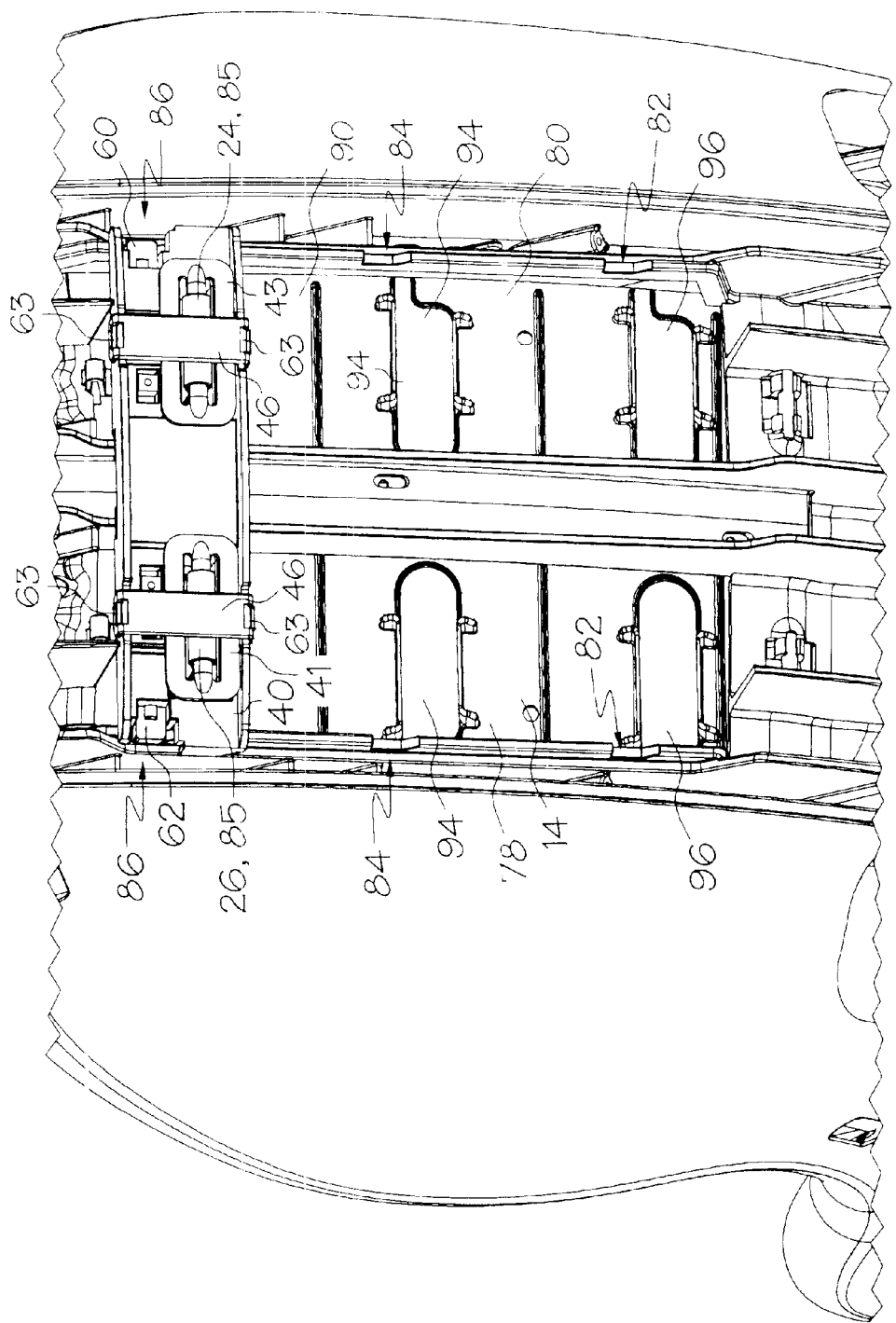
FIG. 9A is a rear view of the car seat of FIG. 9, with the cover in its closed position and the carriage receiving a pair of belts therethrough.
Figure 9B:
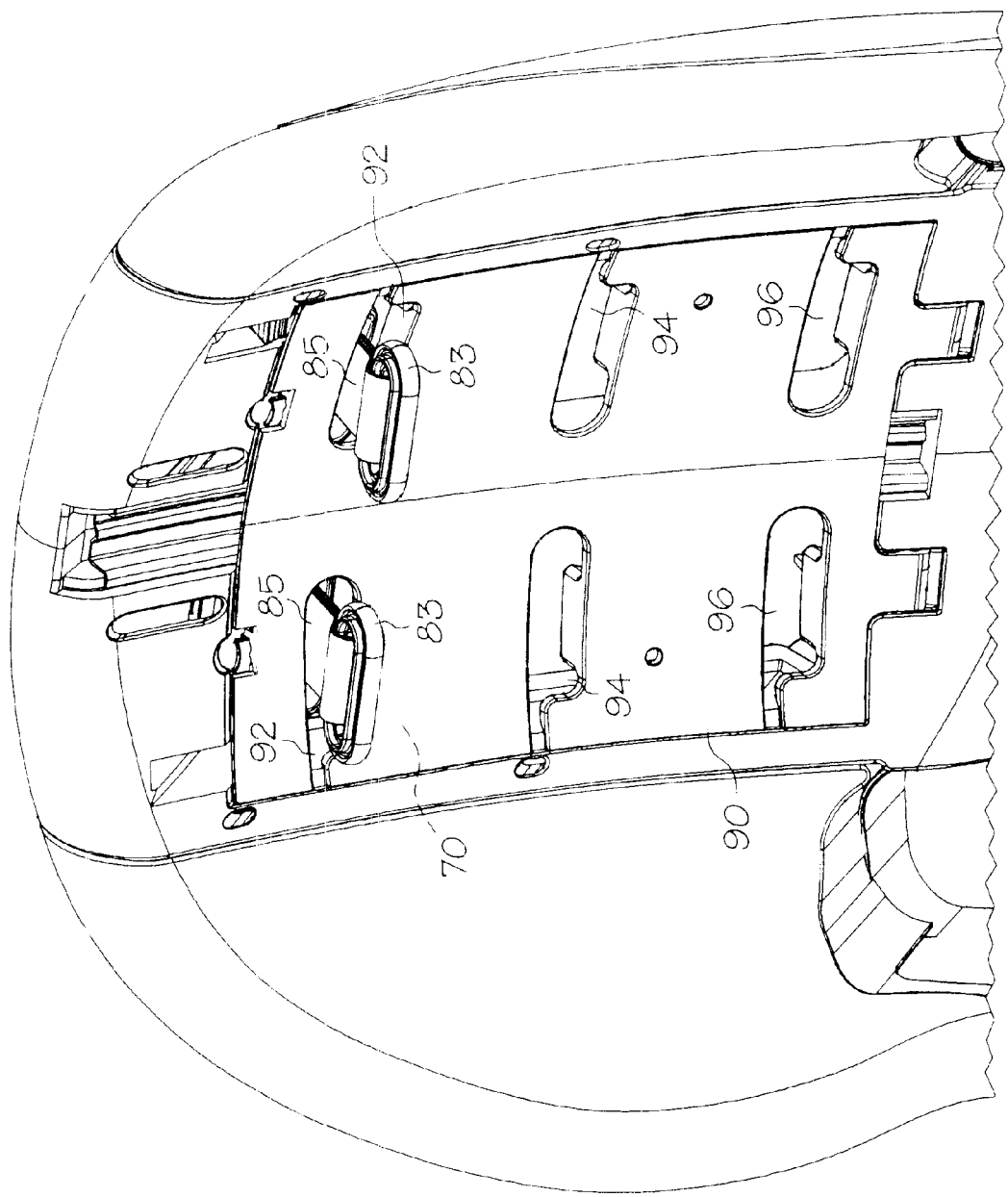
FIG. 9B is a front detail perspective view of the car seat of FIG. 9A.
Figure 11:
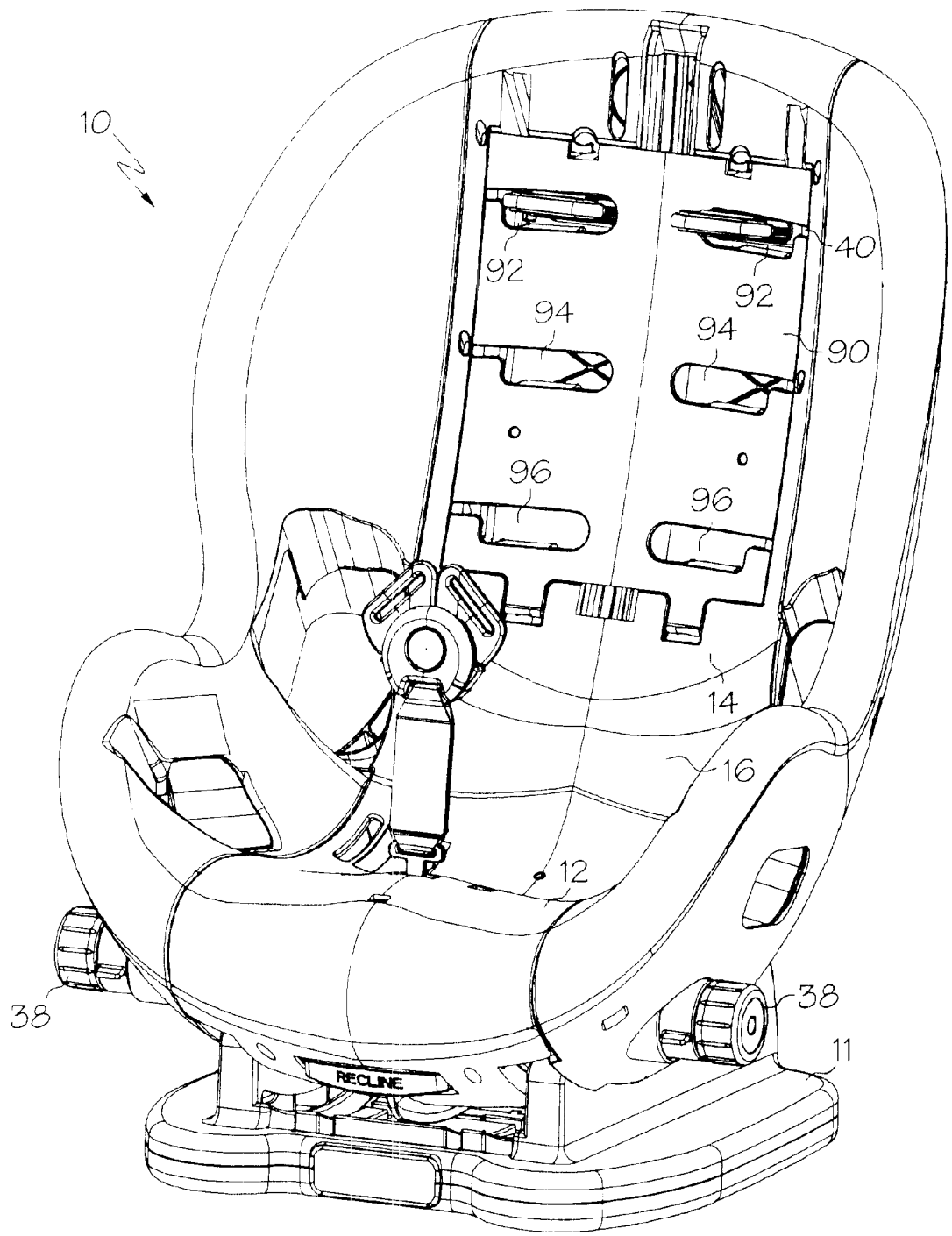
FIG. 11 is a front perspective view of the car seat of FIG. 9, with the cover and a base mounted to the seat.
Figure 12:
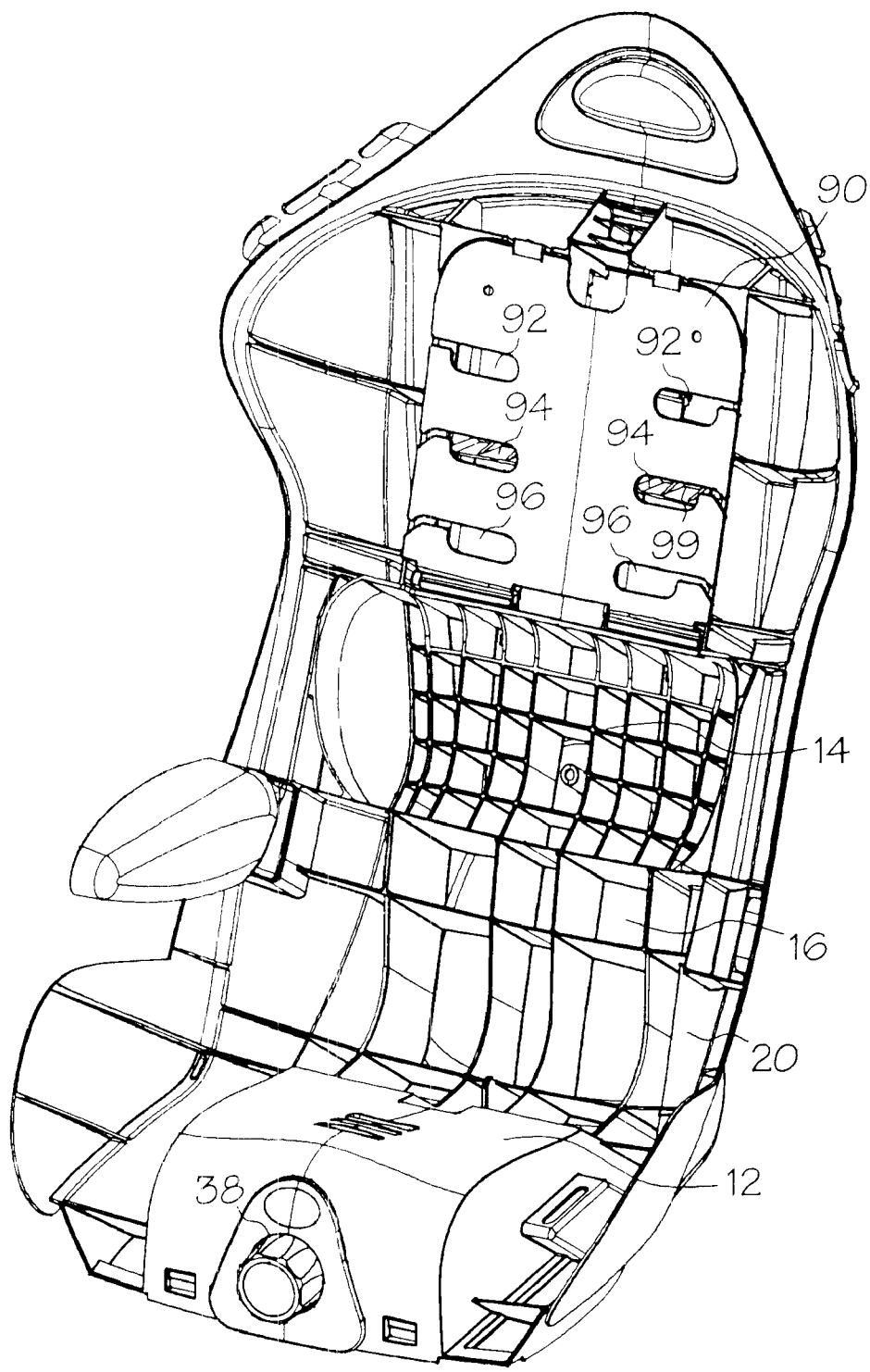
FIG. 12 is a front perspective view of an alternate embodiment of the car seat of the present invention, with the outer cushioned covering and outer skin of the car seat removed.
Figure 13:
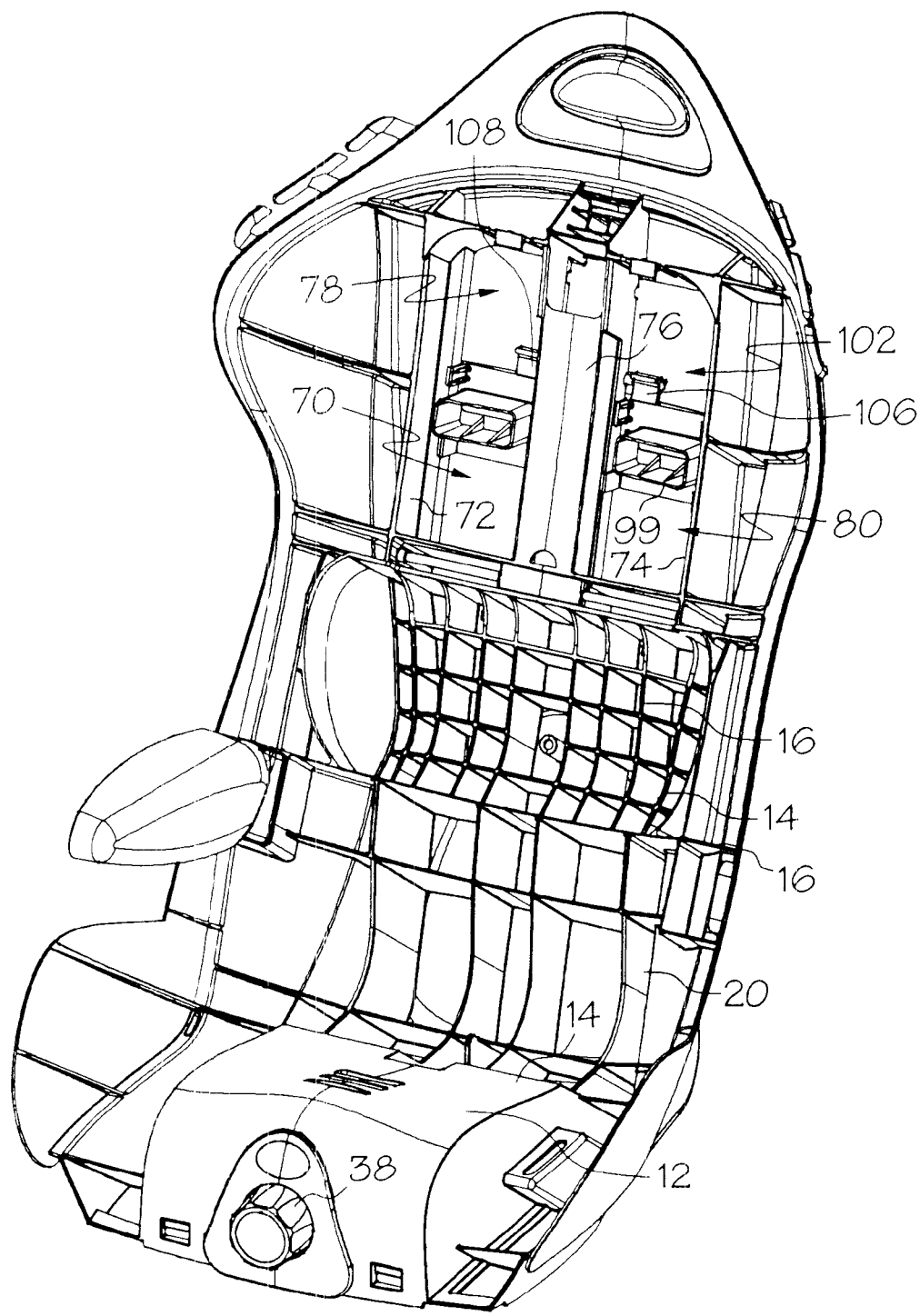
FIG. 13 is a front perspective view of the car seat of FIG. 12, with the cover removed.

As shown in FIGS. 2, 9B and 11, the cover 90 can be removably received in the opening 70 and includes a plurality of generally laterally extending slots 92, 94, 96 to receive the shoulder harnesses 24, 26 at different heights therethrough. As shown in FIGS. 1 and 2, the car seat 10 may also include a back cushion 89 located on the cover 90, the back cushion 89 including a plurality of generally laterally extending slots 91, 93, 95 to receive the shoulder harnesses 24, 26 therethrough.

As shown in FIGS. 2 and 3, the car seat 10 or restraint system 22 may include a carriage 40 which receives the upper end of each shoulder harness 24, 26 therein. The carriage 40 (FIGS. 5 and 6) includes a pair of opposed openings 42, 44, or mouths, each of which receives one of the shoulder harnesses 24, 26 therethrough. Alternately, as shown in FIGS. 3 and 9B, the car seat 10 may include a pair of loops 83, and each loop 83 may be coupled to an extension strap 85 that extends through the mouths 42, 44. In this case each shoulder harness 24, 26 can be coupled to, or slidingly passed through, one of the loops 83, and the extension strap 85 can extend through the slots 92, 94, 96 of the cover 90, and the slots 91, 93, 95 of the back cushion 80. However, in this case and for the purposes of this application the extension straps 85 that are coupled to the shoulder harnesses 24, 26 may be considered to be part of the associated shoulder belt 24, 26. For example, each shoulder harness 24, 26 may include the extension strap 85, a loop 83, and a loop portion 15 that constitutes the majority of the shoulder harness 24, 26 and is shaped to fit over the torso of an occupant and is looped around the loop 83

Figure 6:
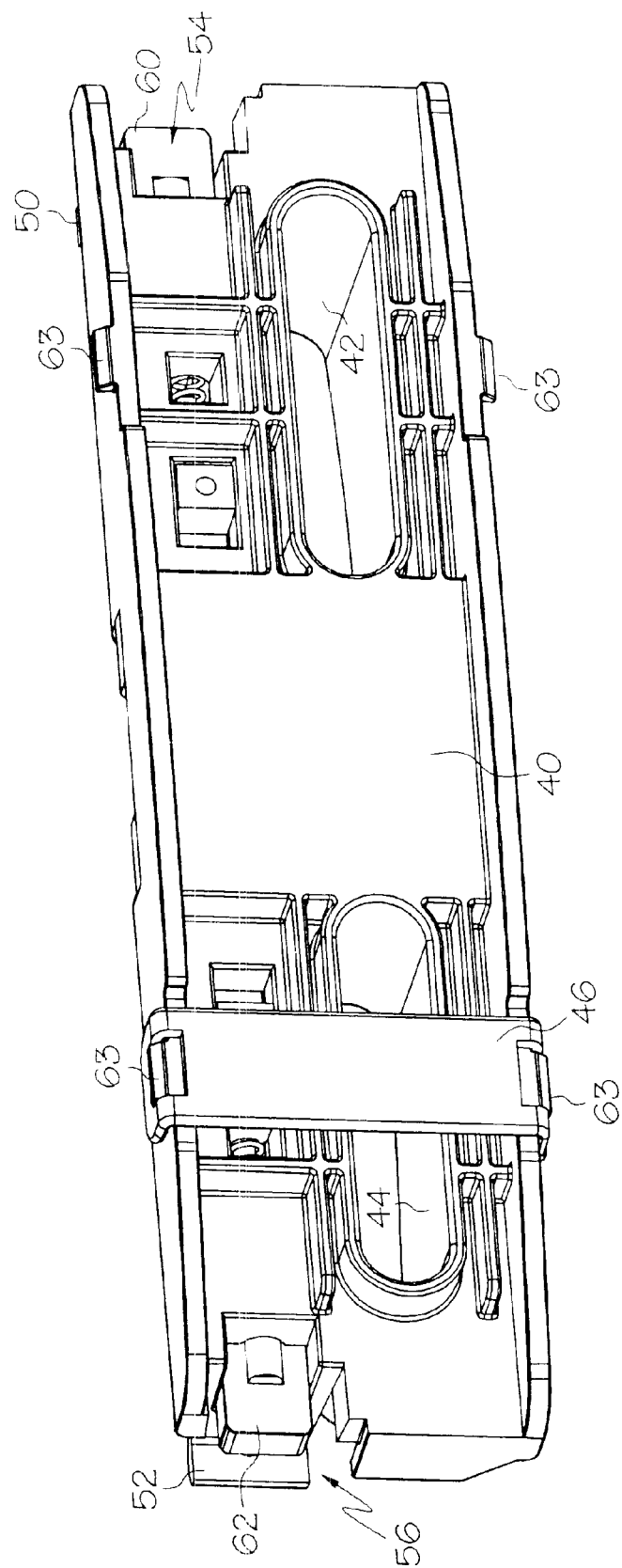
FIG. 6 is a rear perspective view of the carriage of FIG. 5.
Figure 16:
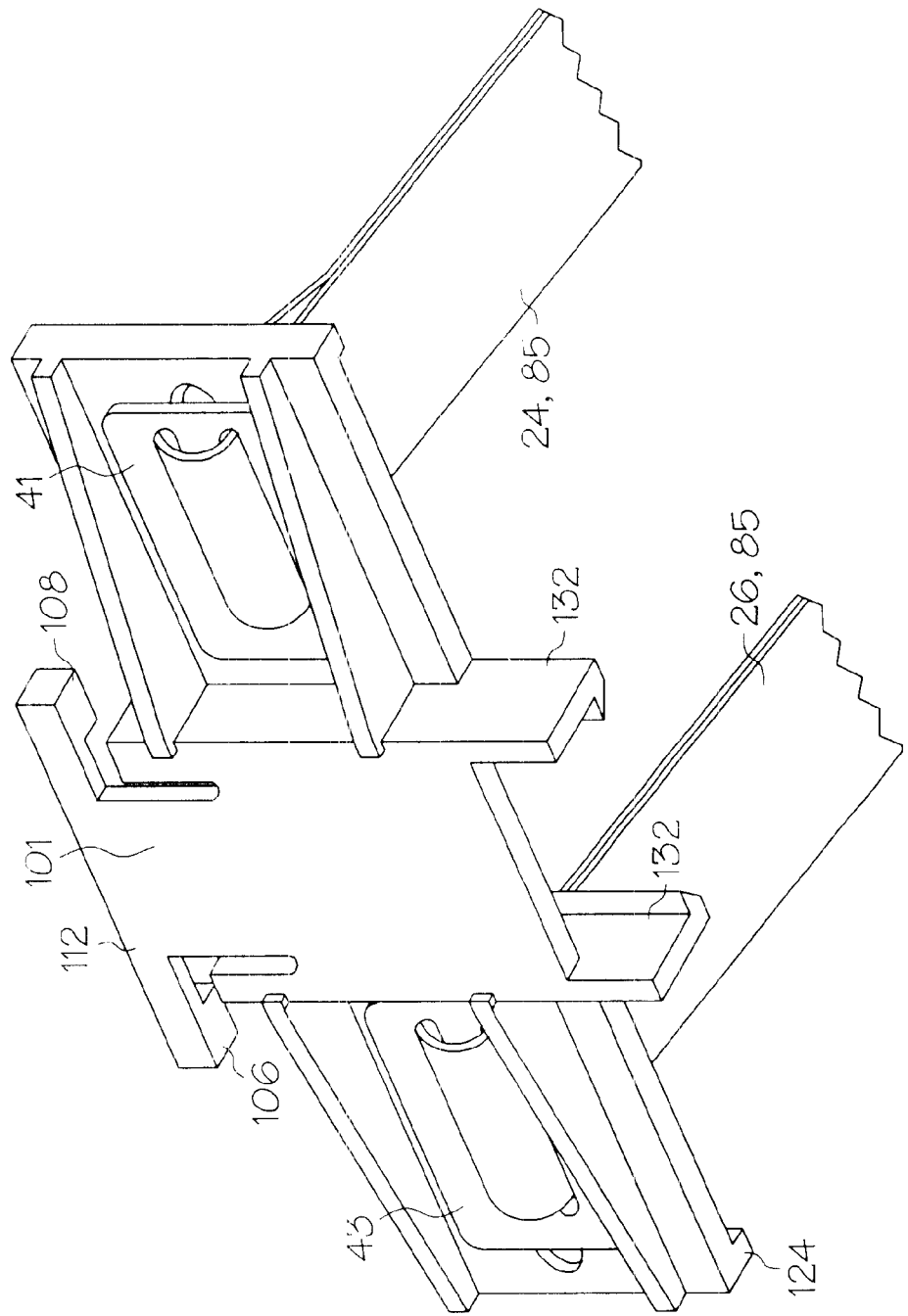
FIG. 16 is a rear perspective view of another embodiment of a carriage.

In the illustrated embodiment, each shoulder harness 24, 26 or extension strap 85 is coupled to a retaining clip 41, 43 (not shown in FIGS. 6–9; see FIGS. 9A and 16) located on the back side of the carriage 40 to couple the shoulder harnesses 24, 26 or extension straps 85 to the carriage 40. In the illustrated embodiment, the retaining clips 41, 43 are loosely held within the carriage 40, and the retaining clips 41, 43 are larger than the mouths 42, 44 to prevent the retaining clips 41, 43 from being pulled through the mouths 42, 44 of the carriage 40. The carriage 40 may include a pair of locking clips 46 (one of which is shown in FIG. 6; two of which are shown in FIG. 9A) that fit over a pair of locking tabs 63 to maintain the retaining clips 41, 43 in the carriage 40. However, the shoulder harnesses 24, 26 or extension straps 85 may be coupled to the carriage 40 in nearly any known manner, such as directly attaching the shoulder harnesses 24, 26 or extension straps 85 to the carriage 40.

The shoulder harnesses 24, 26 or extension straps 85 need not be coupled to the carriage 40. Instead, the shoulder harnesses 24, 26 or extension straps 85 may be slidably passed through the openings 42, 44, extend along the back side 18 of the seat back 14, and extend below the seat pan 12 to a belt tensioning mechanism in a well-known manner. Thus, it should be understood that the harness height adjustment mechanism of the present invention may be used with a wide variety of car seats having a wide variety of shapes and arrangement of harnesses beyond those specifically illustrated herein. For example, the harness height adjustment mechanism may be used with nearly any car seat where it is desired to adjust the height of the belts or harnesses.

Figure 5:
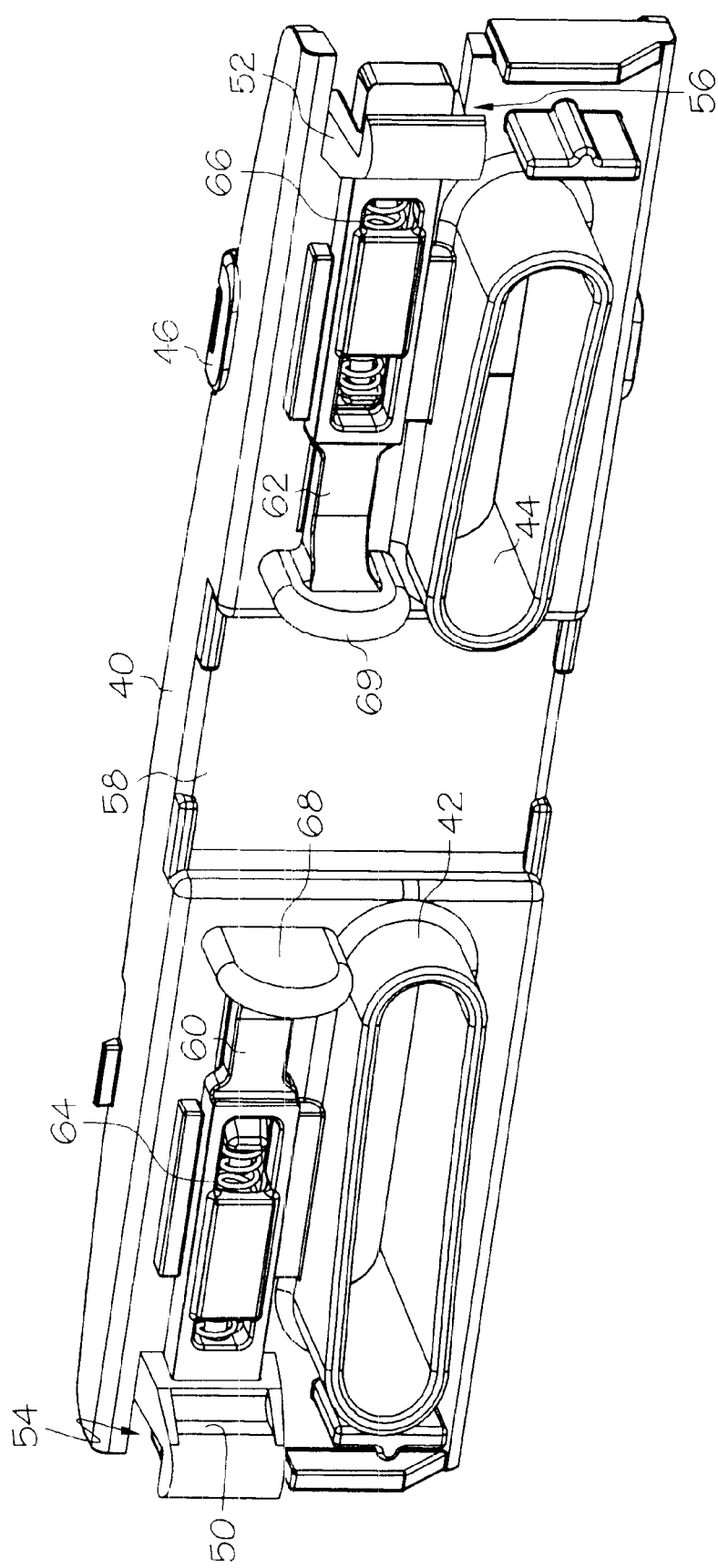
FIG. 5 is a front perspective view of the carriage of FIG. 4.

As shown in FIG. 5, the carriage 40 may include a pair of outwardly-extending flanges 50, 52, each flange defining a channel 54, 56. The carriage 40 includes a central groove 58 on its front surface. The carriage 40 further includes a pair of protrusions 60, 62, each protrusion being slidably mounted to the body of the carriage 40 such that the protrusions 60, 62 are each individually slidable in the horizontal direction of FIG. 5. Each protrusion 60, 62 includes a gripping portion 68, 69 that extends generally perpendicular to the body of the protrusions 60, 62. The carriage 40 further includes a pair of springs 64, 66. Each spring 64, 66 is located between the body of the carriage 40 and one of the protrusions 60, 62 to spring bias the protrusions 60, 62 outwardly.

The carriage 40 is slidably mounted to the seat back 14 (see, e.g., FIGS. 3 and 7) such that the support bar 76 is located in the central groove 58 of the carriage 40, and the outer supports 72, 74 of the seat back 14 are received in the channels 54, 56 of the carriage to slidably couple the carriage 40 to the seat back 14. In this manner, the carriage 40 can move up and down in the opening 70, and the support bar 76 and outer supports 72, 74 guide the sliding motion of the carriage 40. Each mouth 42, 44 of the carriage is located in one of the slots 78, 80. The carriage 40 is completely received in the seat back 14; that is, the seat back 14 includes a thickness, and the carriage 40 has a thickness less than the thickness of the seat back 14 such that the carriage 40 can be received in the opening 70 without protruding from the front side 16 or back side 18 of the seat back 14.

The car seat 10 includes a locking mechanism 100 for coupling the carriage 40 to the seat back 14, and the locking mechanism 100 is located behind the back support surface 17. Each protrusion 60, 62 is movable between an extended position (FIG. 7) and a retracted position (FIG. 8). As shown in FIG. 7, when the locking system 100 is in its extended position the outer ends of each protrusion 60, 62 extends beyond the inner edges of the outer supports 72, 74 and are received in one of the grooves 82, 84, 86 to couple the carriage 40 to the seat back 14. In other words, the interference between the protrusions 60, 62 and the outer supports 72, 74 blocks any sliding motion of the carriage 40 when the protrusions 60, 62 are received in the grooves.

In order to adjust the height of the shoulder harnesses 24, 26 from their position in FIG. 7 (that is, the height at which the harnesses 24, 26 or extension straps 85 intersect the seat back 14 of the car seat 10), the back cushion 89 is first removed or pivoted out of the way. Next, as shown in FIG. 2, the cover 90 is then removed or pivoted out of the way to expose the opening 70 and the carriage 40. Next, the gripping portions 68, 69 of the protrusions 60, 62 are gripped by a user, and pulled towards the support bar 76. As the protrusions 60, 62 are slid towards the support bar 76, the springs 64, 66 are compressed, and the protrusions 60, 62 are pulled out of the grooves 82 in the outer supports 72, 74 as the protrusions 60, 62 are moved to their retracted position (see FIG. 8).

Figure 10:
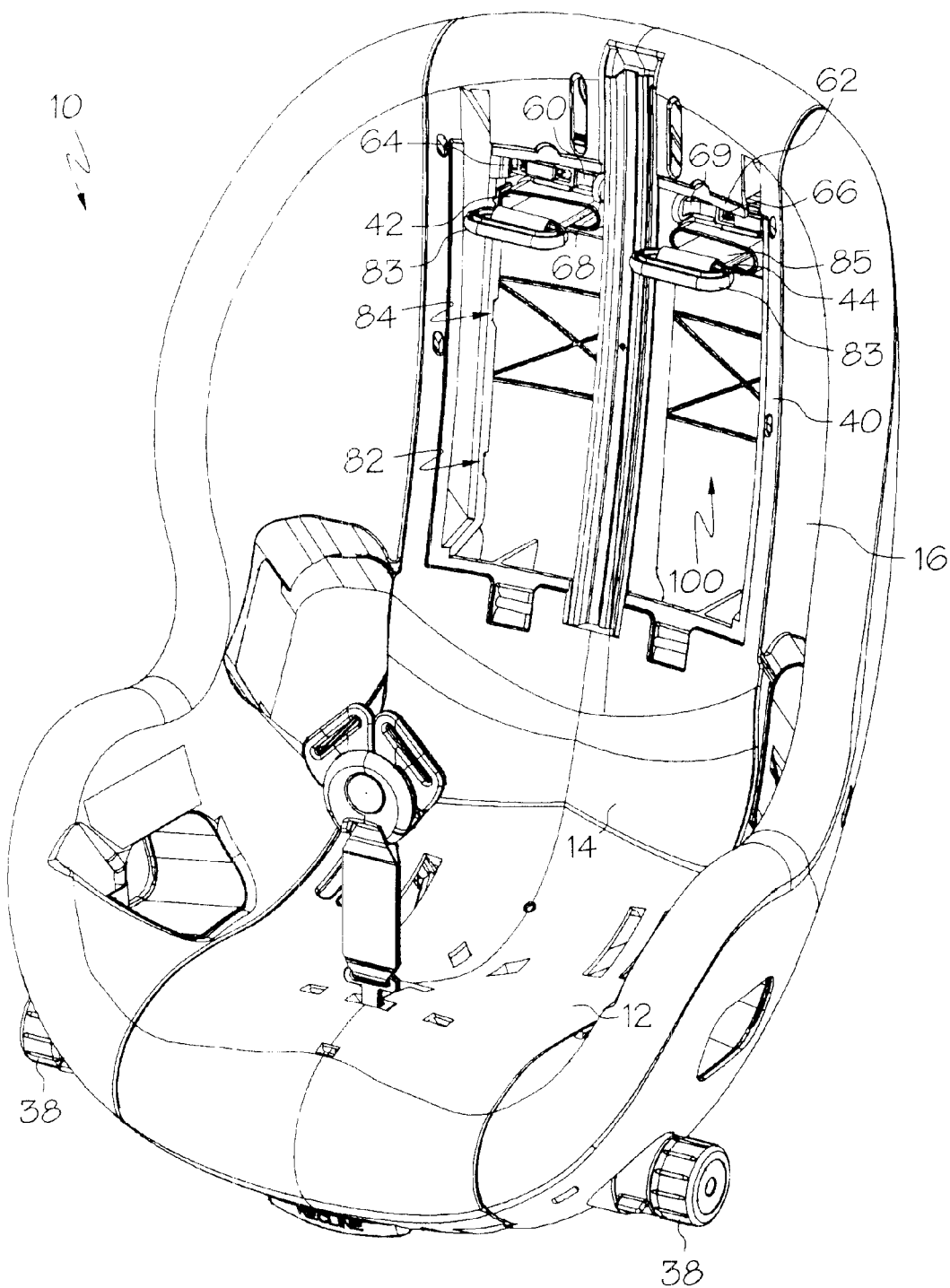
FIG. 10 is a front perspective view of the car seat of FIG. 9A.

At this point, the carriage 40 can be moved vertically to another position wherein the protrusions 60, 62 can be received in one of the set of grooves 84, 86. As the carriage 40 is slid vertically, the support bar 76 and outer supports 72, 74 guide the sliding motion of the carriage 40. Once the carriage 40 is located in the desired position, the user can release the gripping portions 68, 69, and the springs 64, 66 urge the protrusions 60, 62 outwardly such that the outer ends of the protrusions 60, 62 are received in the grooves 86 on the outer supports 72, 74. Once the protrusions 60, 62 are received in the grooves 86, the carriage 40 is locked in place and cannot be moved vertically relative to the seat pan 12 or seat back 14. Thus, because the mouths 42, 44 of the carriage 40 have been moved, the height of the harnesses 24, 26 has also been adjusted (see FIGS. 9B and 10). The carriage 40 is also movable to a middle position wherein the protrusions 60, 62 are received in grooves 84. Thus, any number of grooves may be provided in the outer supports 72, 74 at a variety of heights to provide a plurality of heights at which the carriage 40 can be located.

Instead of gripping the protrusions 60, 62 during the entire sliding movement of the carriage 40, after retracting the protrusions 60, 62 and moving the carriage 40 vertically sufficiently such that the protrusions 60, 62 are not aligned with any of the grooves 82, 84, 86, the user may release the protrusions 60, 62. Once released, the protrusions 60, 62 will engage the sides of the outer supports 72, 74. When the carriage 40 is moved into one of its discreet locking position, the protrusions 60, 62 will become aligned with one of the grooves 82, 84, 86 and will "snap" into one of the set of grooves 82, 84, 86. Each of the grooves 82, 84, 86 may include a guide portion 87 to guide the protrusions 60, 62 into the grooves 82, 84, 86 when the carriage 40 is moved upwardly in this manner.

After the carriage is moved to the desired height and locked in place, the cover 90 is then re-attached to the seat back 14 such that the cover 90 is received in the opening 70 (see FIGS. 9A, 9B and 11), and the shoulder harnesses 24, 26 or extension straps 85 are threaded through the slots 92 of the cover 90. Finally, the back cushion 89 is returned to its position shown in FIG. 1, and the shoulder harnesses 24, 26 or extension straps 85 are received through the set of slots 91 of the cushion 89. At this point, the height of the shoulder harnesses 24, 26 has been adjusted and the car seat 10 can be used in standard fashion.

Because the opening 70 is located on the front side of the car seat 10, the height of the shoulder harnesses 24, 26 can be adjusted from the front side of the car seat. Thus, this feature provides easy access for a user to adjust the height of the shoulder harnesses 24, 26, and enables the height of the shoulder harnesses 24, 26 to be adjusted without uncoupling the car seat 10 from the vehicle. The carriage 40 has a height that is less than the height of the opening 70 so that the carriage 40 can have a full range of motion, and not protrude from the upper and lower edges of the car seat 10 when the carriage is located in its uppermost or lowermost position, respectively.

As shown in FIGS. 1 and 1A, the back cushion 89 may include a set of four tabs 19, 21, 23, 25, each tab being pivotable about a generally vertically extending hinge line 31. Each tab 19, 21, 23, 25 is pivotable about its associated hinge line 31 to an open position to provide a "window" to enable a user to thread the shoulder harnesses 24, 26 or extension straps 85 through the slots 91, 93, 95. For example, slot 91 is located between the tab 19 and the body of the back cushion 89, slot 93 is located between tab 19 and tab 21, and slot 95 is located between the tab 21 and the body of the back cushion 89.

Figure 14:
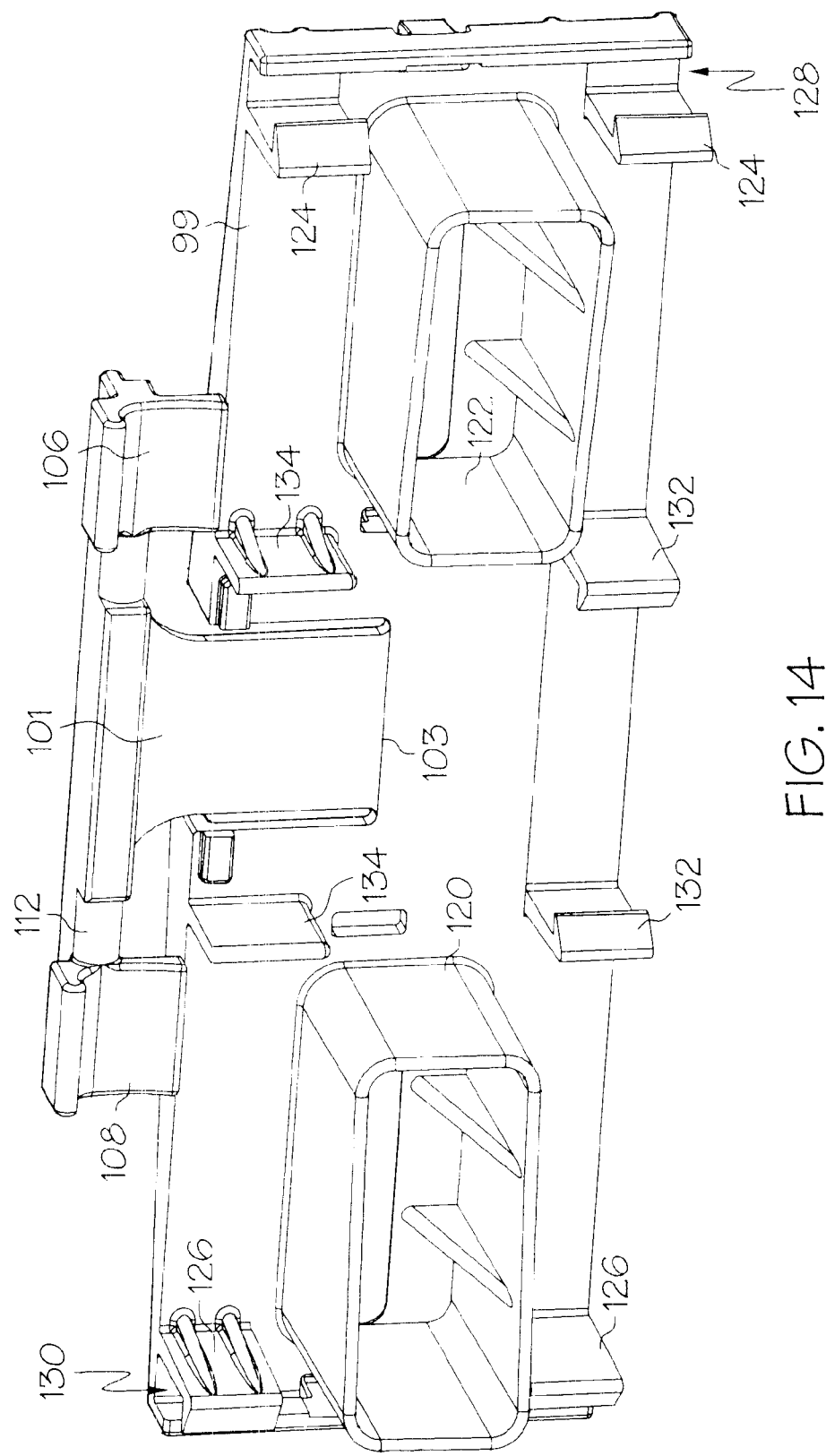
FIG. 14 is a front perspective view of the carriage of the car seat of FIG. 13.
Figure 15:
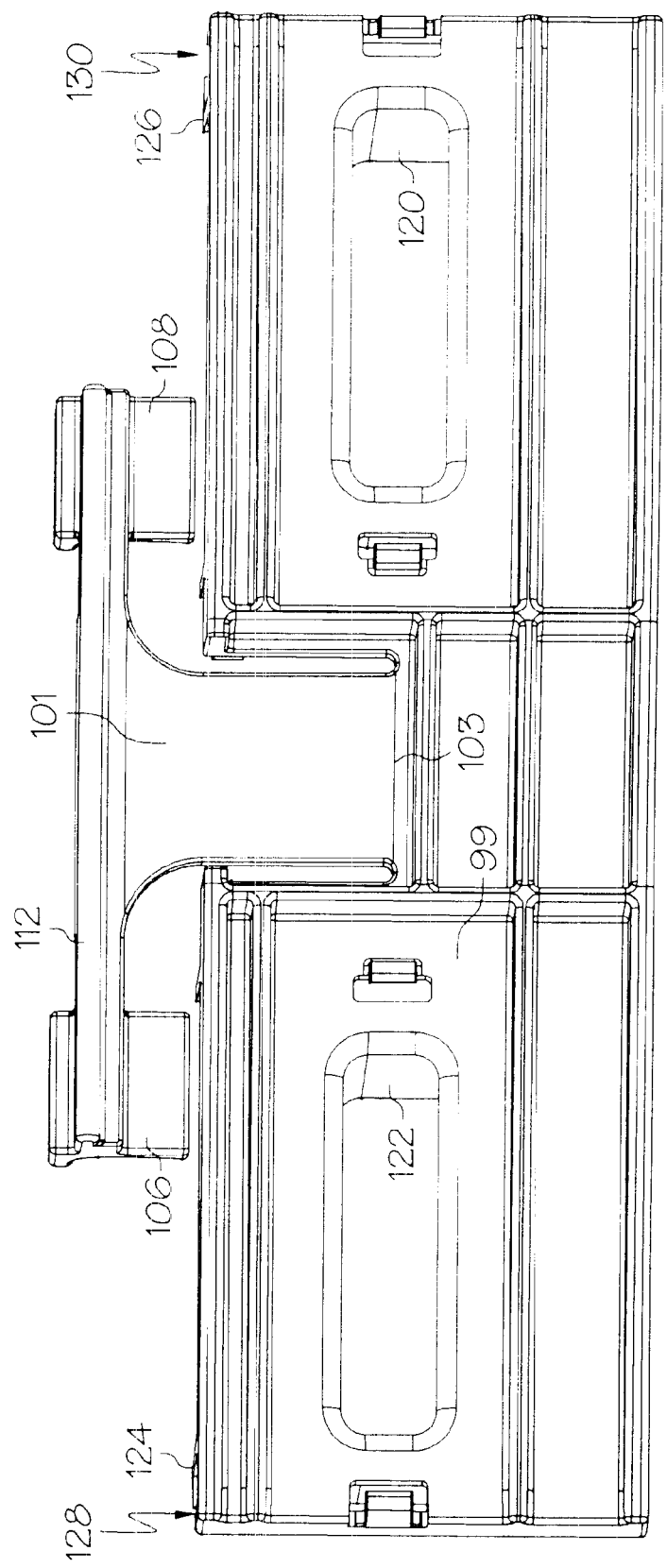
FIG. 15 is a rear perspective view of the carriage of FIG. 14.

An alternate embodiment of the carriage of the present invention is shown in FIGS. 12–18. In this embodiment, the carriage 99 is slidably mounted to the support bar 76 and outer supports 72, 74 in generally the same manner as the carriage 40 illustrated in FIGS. 3–11. However, in the embodiment of FIGS. 12–18, the locking mechanism 102 for locking the carriage 99 in place relative to the seat back 14 differs from the first embodiment. In this embodiment, the support bar 76 includes a plurality of vertically spaced grooves 107, 109, 110 formed on its back side (see FIG. 19). As shown in FIGS. 14–15, the carriage 99 includes a flexible tab 101 extending from the body of the carriage 99 from a hinge line 103. The tab 101 is generally "T"-shaped, and includes a pair of flats 106, 108 on either end of the tab 101, and a cross bar 112 located between the flats 106, 108. The cross bar 112 is shaped and biased to fit into one of the grooves 107, 109, 110 of the support bar 76. In this manner, when the cross bar 112 is received in one of the grooves 107, 109, 110, the carriage 99 is coupled to the seat back 14 and is blocked from being adjusted vertically.

Figure 17:
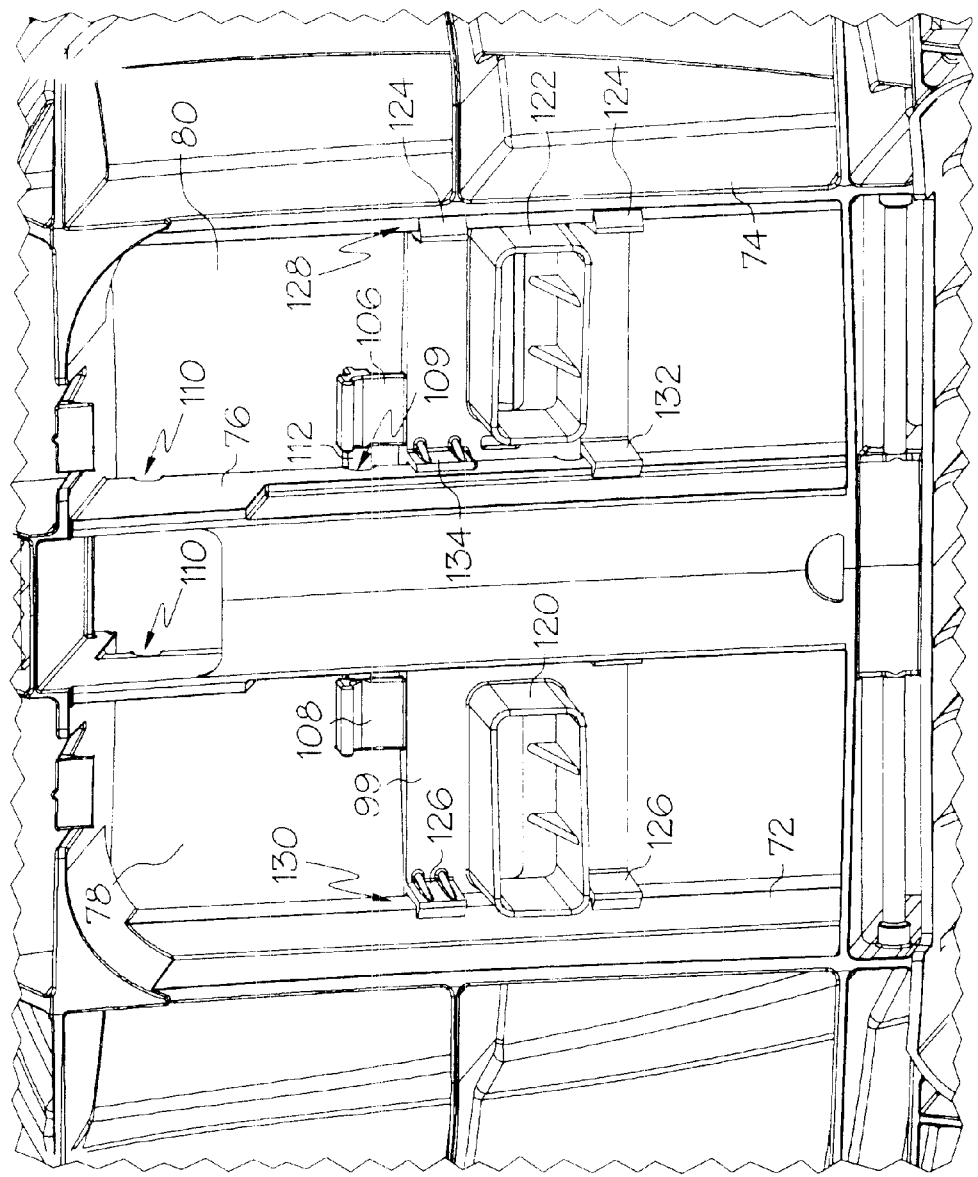
FIG. 17 is a detail front perspective view of the car seat of FIG. 13.
Figure 18:
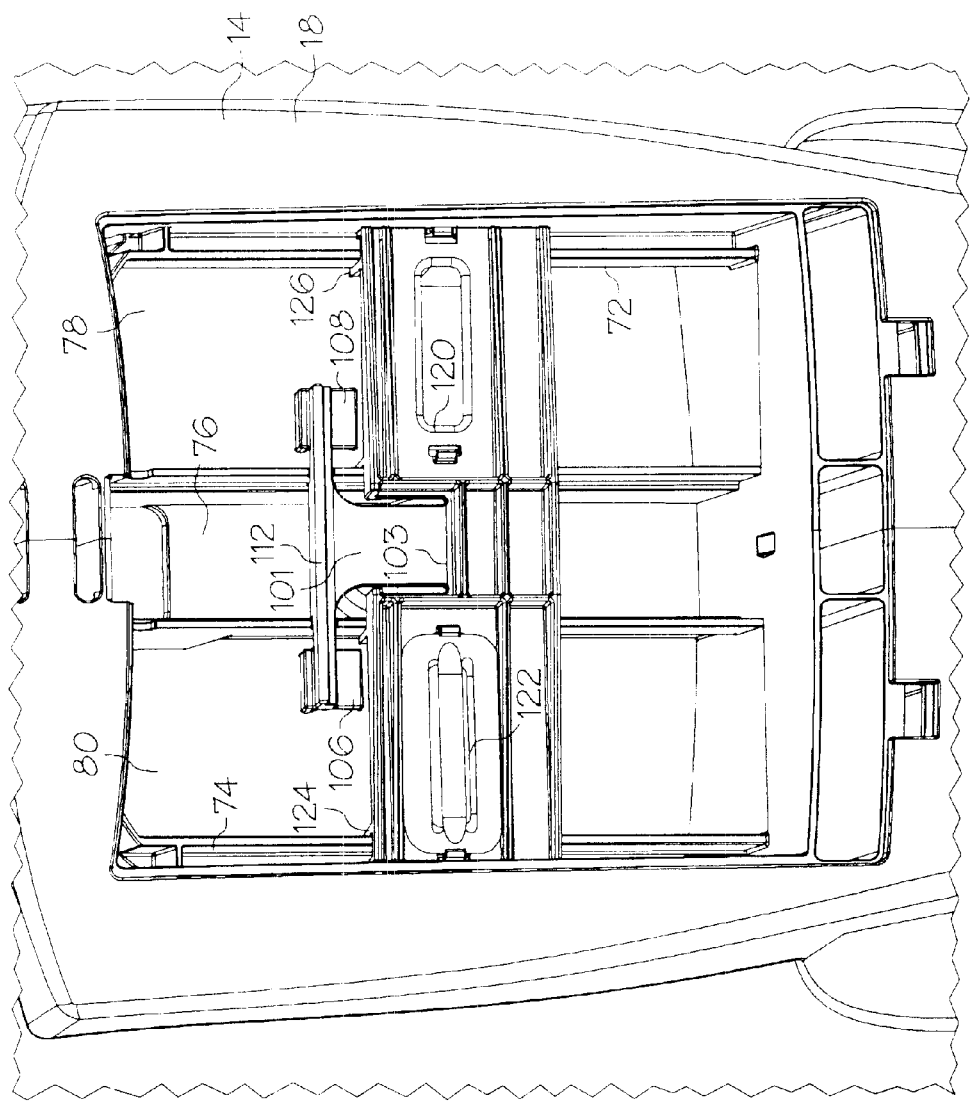
FIG. 18 is a rear detail perspective view of the car seat of FIG. 13.

The carriage 99 includes a pair of mouths 120, 122 for receiving the belts 22, 24 or extension straps 85 therethrough and a pair of sets of outwardly extending flanges 124, 126 that define a pair of channels 128, 130 for slidably receiving the outer supports 72, 74. The carriage 99 further includes a set of inner flanges 132 and guides 134 for receiving the support bar 76 therebetween. When the carriage 99 is mounted to the seat back 14, the outer supports 72, 74 are received in the channels 128, 130 and the support bar 76 is received between the flanges 132 and guides 134, as shown in FIGS. 17 and 18. The cross bar 112 is biased against the support bar 76 such that the cross bar 112 is biased into one of the grooves 107, 109, 110 when the carriage 99 is aligned with one of the grooves. When the cross bar 112 is received in one of the grooves 107, 109, 110, the carriage 99 is blocked from sliding along the seat back 14, as shown in FIG. 17.

When the carriage 99 is coupled to the seat back 14, the flats 106, 108 are located on opposite sides of the support bar 76 and each flat 106, 108 is located in one of the slots 78, 80. The flats 106, 108 provide a surface upon which a user can push to urge the cross bar 112 out of one of the grooves 107, 109, 110, thereby enabling the carriage 99 to slide vertically along the seat back. For example, a user may press on each of the flats 106, 108 to urge the flats rearwardly, which in turn pivots the flexible tab 101 about hinge line 103 and pulls the cross bar 112 out of the corresponding groove 107, 109, 110 in the support bar 76. The carriage 99 can then be slid along the side supports 72, 74 and support bar 76 to a different vertical location. The flats 106, 108 can then be released, and the cross bar 112 automatically returns to a position in which it is received in one of the grooves 107, 109, 110, or biased against the support bar 76

The tabs and slots disclosed herein for locking the carriages 40, 99 at various discrete vertical locations in the seat back 14 may be replaced with a wide variety of mechanisms for coupling the harness to the seat back without departing from the scope of the present invention. For example, a variety of tabs, protrusions, pins, interference mechanisms, and the like may be used without departing from the scope of the present invention. Furthermore, the carriage 40, 99 of the present invention may be a two-part carriage wherein each part of the carriage receives a belt 22, 24 or extension strap 85 and is individually adjustable along the seat back. In this manner, each carriage, and thereby each shoulder harness, may be individually adjustable. For example, each carriage may include a pair of laterally-slidable protrusions that can be received in recesses in one of the outer support 72, 74 and the support bar 76, although a wide variety of other locking mechanism may also be used.

Having described the invention in detail and by reference to the preferred embodiments, it will be apparent that modifications and variations thereof are possible without departing from the scope of the invention.

What is claimed is:

1. A child or infant car seat having adjustable shoulder harnesses comprising:

a body having a seat pan and a seat back, said seat back having a front side, a back side, and an opening in said front side;

a pair of shoulder harnesses shaped and located to fit over the shoulder of an occupant located on said body, each shoulder harness extending generally outwardly from said seat back and being movable relative to said seat pan to raise or lower the height of said shoulder harnesses; and a locking mechanism for locking said shoulder harnesses in place to set the height of each shoulder harness relative to said seat pan, wherein said locking mechanism can be accessed from said front side of said seat back by reaching through said opening.

2. The car seat of claim 1 wherein said seat back includes an opening therein to provide front side access to said locking mechanism.

3. The car seat of claim 2 further comprising a cover that is removably receivable in said opening.

4. The car seat of claim 3 wherein said cover includes a plurality of generally laterally extending slots to enable said shoulder harnesses to pass through said cover at a plurality of height locations.

5. The car seat of claim 4 further comprising a cushion located on said cover, said cushion including a plurality of generally laterally extending slots to enable said shoulder harnesses to pass through said cover at a plurality of height locations.

6. The car seat of claim 1 further comprising a belt tensioning mechanism coupled to said body, and wherein said shoulder harnesses are coupled to said belt tensioning mechanism such that the tension of said shoulder harnesses can be controlled by said belt tensioning mechanism.

7. The car seat of claim 1 wherein said seat back includes an opening therein to provide front side access to said locking mechanism, the car seat further comprising a carriage coupled to said shoulder harnesses and being slidingly mounted to said seat back, said carriage being lockingly engageable with said seat back by said locking mechanism.

8. The car seat of claim 7 wherein said carriage has a height that is less than a height of said opening.

9. The car seat of claim 7 wherein each shoulder harness slidably extends through said carriage.

10. The car seat of claim 7 wherein said carriage includes a pair of openings, and wherein each shoulder harness extends through one of said openings.

11. The car seat of claim 7 wherein said seat back includes a thickness, and wherein said carriage is received in said seat back and has a thickness less that said thickness of said seat back such that said carriage does not protrude outwardly from said seat back.

12. The car seat of claim 7 wherein said locking mechanism is shaped to lockingly engage said carriage to said seat back at a plurality of discreet locations such that the height of said shoulder harnesses can be set at a corresponding plurality of discreet locations.

13. The car seat of claim 12 wherein said seat back includes a plurality of notches formed therein and said locking mechanism includes at least one flange coupled to said carriage and shaped to be received in one of said notches, wherein said carriage is lockingly coupled to said seat back when said flange is received in one of said notches.

14. The car seat of claim 13 wherein said car seat includes a generally vertically-extending support bar located in said opening to define a pair of slots located on either side of said support bar, and wherein said carriage includes a pair of mouths, each mouth being located in one of said slots and receiving one of said shoulder harnesses therethrough.

15. The car seat of claim 14 wherein said carriage includes a pair of outer supports located on opposite sides of said opening, each outer support having a plurality of notches formed therein, and wherein said locking mechanism includes an auxiliary flange coupled to said carriage, each flange being shaped to be received in a notch in one of said outer supports to lock said carriage in place.

16. The car seat of claim 15 wherein each flange is slidably mounted to said carriage and spring biased outwardly relative to said support bar.

17. The car seat of claim 15 wherein each flange includes a gripping projection located adjacent to the other gripping projection such that both of said gripping projections can be simultaneously gripped by a single hand of a user.

18. The car seat of claim 14 wherein said support bar includes a plurality of vertically-spaced notches, and wherein said locking mechanism includes a protrusion coupled to said carriage and shaped to be received in any one of said notches to lock said carriage in place.

19. The car seat of claim 18 wherein said notches are formed in a rear surface of said support bar, and wherein said protrusion is biased to be received in one of said notches.

20. The car seat of claim 19 wherein said carriage includes a pair of flats coupled to said protrusion, one flat being located on each side of said support bar such that said flats can be pushed rearwardly by a user to urge said protrusion out of one of said notches.

21. The car seat of claim 7 wherein said locking mechanism is coupled to said carriage, and wherein said carriage is received in and movable within said opening.

22. The car seat of claim 1 wherein each shoulder harness is independently movable relative to said seat back and said locking mechanism includes a pair of independently movable carriages, each carriage receiving one of said shoulder harnesses therethrough and being slidably mounted to said seat back.

23. The car seat of claim 1 wherein each shoulder harness includes a loop, a loop portion coupled to said loop and shaped to fit around the torso of an occupant, and an extension belt coupled to said loop and extending generally outwardly from said seat back.

24. The car seat of claim 23 wherein said loop portion of said shoulder harness is looped about said loop.

25. The car seat of claim 1 further comprising a pair of lap belts, each lap belt being coupled to said seat pan and shaped and located to lie on top of the lap of an occupant.

26. The car seat of claim 25 further comprising a pair of latches and a buckle coupled to said seat pan, one of each of said lap belts and shoulder harnesses being coupled to one of said latches, each of said latches being removably receivable in said buckle.

27. The car seat of claim 1 wherein said car seat is shaped to be removably coupled to a seat of a vehicle.

28. The car seat of claim 27 wherein each shoulder harness is coupled to said body.

29. The car seat of claim 1 wherein seat back includes a back support surface shaped and located to support the back of an occupant, and wherein said locking mechanism is located behind said back support surface.

30. The car seat of claim 1 wherein said locking mechanism can be accessed and operated by a user reaching his or her hands through said opening to manually manipulate said locking mechanism.

31. The car seat of claim 1 wherein said locking mechanism is accessible from a front side of said seat back without reaching behind or around said seat back.

32. A child or infant car seat having adjustable shoulder harnesses comprising:
- a body having a seat pan and a seat back, said seat back having an opening formed therein and located on a front side thereof;
- a pair of shoulder harnesses shaped and located to fit over the shoulder of an occupant located on said body, each shoulder harness extending generally forwardly from said seat back;
- a carriage slidably coupled to said seat back and being movable relative to said seat pan to raise or lower the height of said shoulder harness, said carriage being lockable in place relative to said seat back, wherein said carriage can be accessed through said opening to lock or unlock and move said carriage relative to said seat back; and
- a cover shaped to receive said shoulder harnesses therethrough and to cover said opening.

33. A child or infant car seat having adjustable shoulder harnesses comprising:
- a body having a seat pan and a seat back;
- at least one shoulder harness shaped and located to fit over the shoulder of an occupant of said car seat, said shoulder harness being movable relative to said seat pan to raise or lower the height of said shoulder harness; and
- a locking mechanism coupled to said seat body for setting the height of said at least one shoulder harness relative to said seat pan, said locking mechanism being accessible from a front side of said seat back without reaching behind or around said seat back and further comprising an opening in said seat back through which said shoulder harness extends, and wherein said car seat includes a cover removably receivable in said opening.

34. A child or infant car seat having an adjustable shoulder harness comprising:
- a body having a seat pan and a seat back, said seat back including an opening therein;
- at least one shoulder harness shaped and located to fit over the shoulder of an occupant of said car seat, said shoulder harness being movable relative to said seat pan to raise or lower the height of said shoulder harness; and
- a locking mechanism coupled to said seat body for setting the height of each shoulder harness relative to said seat pan, said locking mechanism being accessible from a front side of said seat back through said opening; and
- a cover received in or over said opening.

35. A child or infant car seat having adjustable shoulder harnesses comprising:
- a body having a seat pan and a seat back;
- at least one shoulder harness shaped and located to fit over the shoulder of an occupant of said car seat, said shoulder harness being movable relative to said seat pan to raise or lower the height of said shoulder harness; and
- a locking mechanism coupled to said seat body for setting the height of said at least one shoulder harness relative to said seat pan, said locking mechanism being accessible from a front side of said seat back without reaching behind or around said seat back wherein said seat back has a front side having an opening therein which provides said front side access to said locking mechanism.

36. A method for adjusting the height of at least one harness of a child or infant car seat comprising the steps of:
- providing a child or infant car seat having a body having a seat pan, a seat back having an opening, at least one shoulder harness shaped and located to fit over the shoulder of an occupant, said shoulder harness extending generally forwardly from said seat back, and a locking mechanism;
- accessing said locking mechanism from a front side of said car seat, without reaching behind or around said seat back, to release said locking mechanism such that said shoulder harness is vertically movable along said seat back;
- moving said shoulder harness relative to said seat back to a desired position; and
- coupling said shoulder harness to said seat back by said locking mechanism such that the height of said shoulder harness is locked in place relative to said seat pan wherein said accessing step includes accessing said locking mechanism through said opening.

37. A child or infant car seat having adjustable shoulder harnesses comprising:
- a body having a seat pan and a seat back, said seat back having a front side and a back side;
- a pair of shoulder harnesses shaped and located to fit over the shoulder of an occupant located on said body, each shoulder harness extending generally outwardly from said seat back and being movable relative to said seat pan to raise or lower the height of said shoulder harnesses;
- a carriage slidingly mounted to said seat back, said carriage interacting with each harness to set the height of each shoulder harness relative to said sat pan; and
- a locking mechanism for lockingly engaging said carriage with said seat back, wherein said locking mechanism can be accessed from said front side of said seat back, wherein said seat back includes an opening therein to provide said front side access to said locking mechanism.

* * * * *